United States Patent
Michel et al.

(10) Patent No.: US 10,205,505 B2
(45) Date of Patent: Feb. 12, 2019

(54) COMMUNICATIONS METHODS AND APPARATUS

(71) Applicant: M87, Inc., Austin, TX (US)

(72) Inventors: Jonas Michel, Austin, TX (US); Vidur Bhargava, Austin, TX (US); Christine Julien, Austin, TX (US)

(73) Assignee: M87, Inc., Bellevue, WA (US)

( * ) Notice: Subject to any disclaimer, the term of this patent is extended or adjusted under 35 U.S.C. 154(b) by 0 days.

(21) Appl. No.: 15/253,738

(22) Filed: Aug. 31, 2016

(65) Prior Publication Data

US 2017/0054488 A1 Feb. 23, 2017

Related U.S. Application Data

(63) Continuation-in-part of application No. 14/705,104, filed on May 6, 2015, now Pat. No. 9,451,514.

(60) Provisional application No. 62/121,386, filed on Feb. 26, 2015.

(51) Int. Cl.
| | |
|---|---|
| H04W 4/02 | (2018.01) |
| H04B 7/15 | (2006.01) |
| H04W 36/14 | (2009.01) |
| H04L 12/801 | (2013.01) |
| H04W 28/14 | (2009.01) |
| H04W 40/24 | (2009.01) |
| H04W 48/12 | (2009.01) |
| H04J 11/00 | (2006.01) |
| H04W 84/12 | (2009.01) |
| H04W 88/04 | (2009.01) |

(52) U.S. Cl.
CPC .............. *H04B 7/15* (2013.01); *H04L 47/17* (2013.01); *H04W 4/02* (2013.01); *H04W 28/14* (2013.01); *H04W 36/14* (2013.01); *H04W 40/244* (2013.01); *H04J 11/00* (2013.01); *H04W 48/12* (2013.01); *H04W 84/12* (2013.01); *H04W 88/04* (2013.01)

(58) Field of Classification Search
CPC ........ H04W 24/00; H04W 60/00; H04W 8/06
See application file for complete search history.

(56) References Cited

U.S. PATENT DOCUMENTS

| | | | |
|---|---|---|---|
| 2010/0240361 A1* | 9/2010 | Jiang | H04W 8/06 455/426.1 |
| 2013/0103768 A1* | 4/2013 | Freebeck | H04L 51/36 709/206 |

\* cited by examiner

*Primary Examiner* — Diane Mizrahi
(74) *Attorney, Agent, or Firm* — Straub & Straub; Michael P. Straub; Stephen T. Straub

(57) ABSTRACT

Methods and apparatus for supporting efficient communications of time varying data are described. A wireless device monitors to detect receipt of a first identifier, e.g., an LTED OTACode, via a first network interface, said first identifier corresponding to first information that is available via the first network, said first information indicating a source of first time varying data and a description of the first time varying data. The wireless device monitors to detect receipt of a second identifier, e.g., a hash value, via a second network interface, e.g., a WIFI, interface. The wireless device determines if the first identifier was received on the first interface and if a second identifier, corresponding to the first identifier, was received on the second interface. The wireless device makes a decision whether or not to retransmit the second identifier. The wireless device retrieves, uses and/or supplies the first time varying data to other devices.

20 Claims, 17 Drawing Sheets

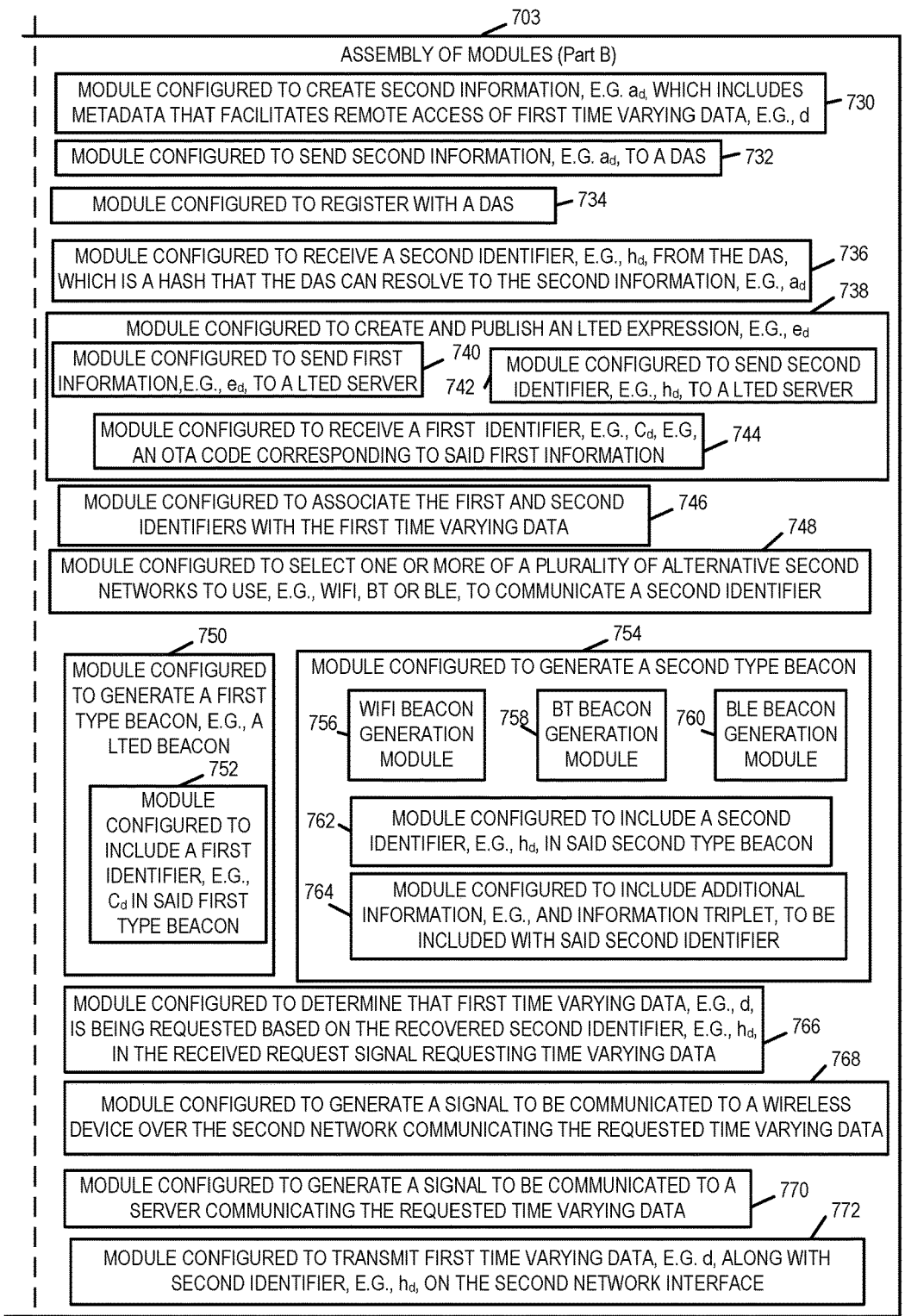

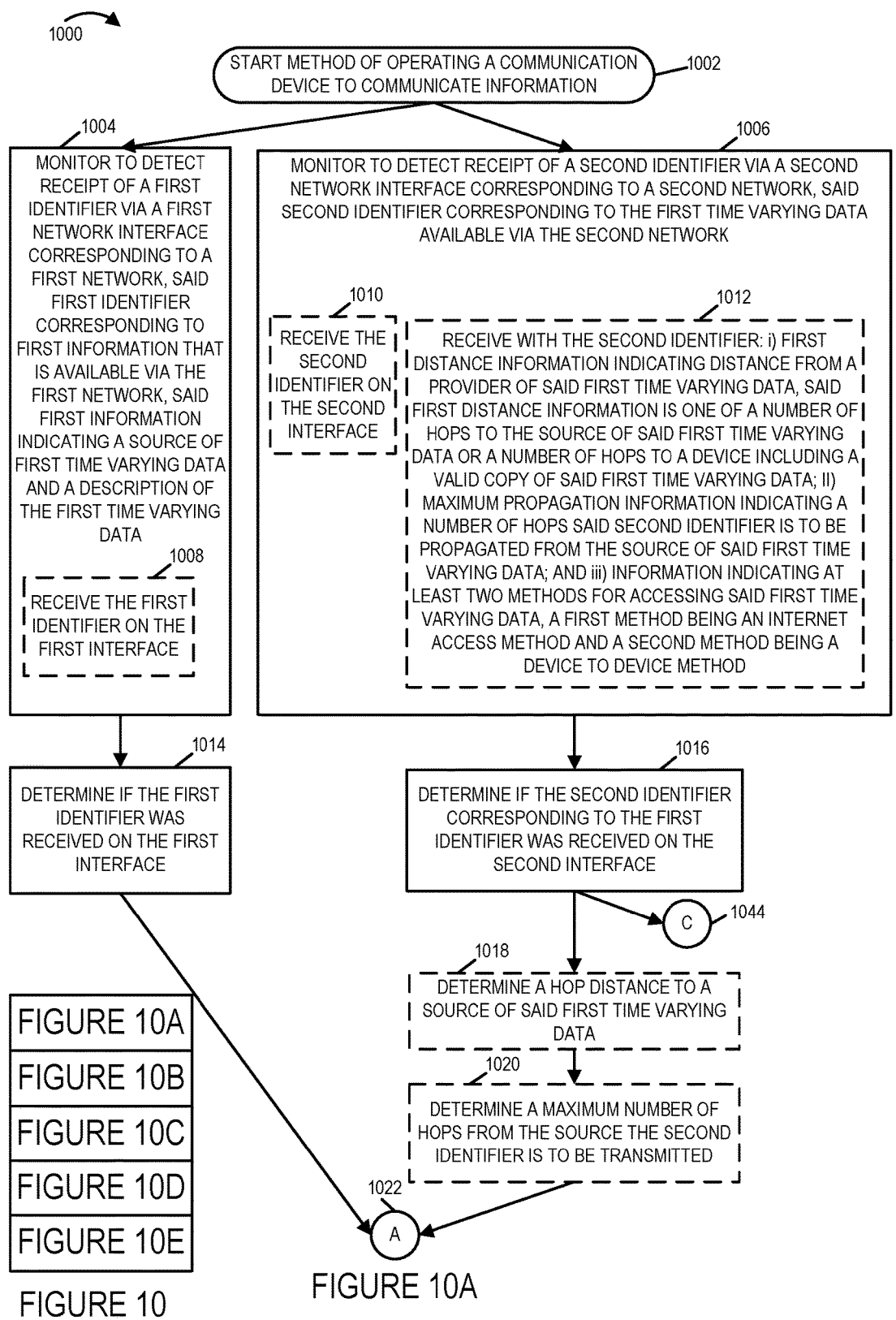

COMMUNICATIONS METHODS AND APPARATUS

RELATED APPLICATIONS

The present application is a continuation-in-part of U.S. patent application Ser. No. 14/705,104, filed May 6, 2015 which claims benefit of U.S. Provisional Patent Application Ser. No. 62/121,386 filed Feb. 26, 2015 each of which is hereby expressly incorporated by reference in their entirety.

FIELD

Various embodiments relate to methods and apparatus for communicating time varying data, and more particularly, to efficiently wirelessly communicating time varying data using beacons and/or multiple networks.

BACKGROUND

Data may be wirelessly advertised using several current technologies. One such technology is LTE Direct (LTED). With LTED a device may publish and subscribe to "expressions." A discovery beacon, containing a bit code (OTACode), is broadcasted to publish an expression to proximate neighbor devices. Publication and subscription OTACodes must be resolved at a centralized Expression Name Server (ENS). In other words, data is indirectly communicated through the ENS. LTED is advantageous because it adheres to the 3GPP standard. However, publishing dynamic data requires re-publishing an expression whenever it changes generating a new OTACode. A device receiving the "updated" OTACode must resolve the unrecognized code at the ENS preventing caching on the receiver's side.

Other alternative technologies which are used to advertise data include WiFi, Bluetooth (BT), and Bluetooth Low Energy (BLE). With these technologies, a device may directly write to and read from elements in broadcasted beacons. WiFi beacons provide Information Elements (IEs) in which arbitrary bytes can be written and read. Similarly, devices in the Bluetooth (BT) and Bluetooth Low Energy (BLE) peripheral role may use advertisement packets (ADs) to broadcast arbitrary bytes. A BT/BLE device in the central role may scan for ADs and read their contents when received. WiFi and BT/BLE may directly communicate data through IEs/ADs. WIFI/BT/BLE advertisement is advantageous because dynamic data may be placed directly into IEs/ADs. However, there is no standardized format for representing dynamic data as a sequence of bytes.

While LTED provides a method of communicating at least some information to devices, LTE networks and devices for assigning OTACodes are normally managed by a macro network operator, e.g., an operator of a network which uses licensed spectrum. Normally, whenever information to be associated with an OTACode is changed, there is a requirement that a new OTACode be assigned to the new information. The new OTACode and information must then be propagated out to LTED devices for it to be useful. From a management as well as macro network resource utilization perspective, it may be desirable to avoid issuing new OTACodes on a frequent basis. Thus, while OTACodes can be useful for some information and well suited for static or information that changes at relatively large intervals, the overhead associated with trying to communicate rapidly chaining information using LTED and OTACodes can be undesirable. For example, while it may be desirable for a business owner to advertise the presence of a store at a particular location, it may be undesirable from an overhead perspective, at least of some entities, to advertise frequently changing customer line length information or other rapidly varying wait time information for the store via LTED.

In the case of WiFi, Bluetooth and other local networks which do not involve use of macro network resources and/or require involvement of macro network entities for purposes of assigning codes and propagating information associated with codes, a local entity can more readily manage the updating and communicating of rapidly changing information without worrying about the overhead associated with changes of information that would require assignment of a new OTACode if the changing information was to be communicated through the use of LTED. Thus, it might be easy for a store owner to update a server or other Internet accessible device to show current line lengths while it might be more involved if the owner of the store were to try to update and communicate such information via LTED.

Often, LTED beacons propagate further than beacons of short area networks such as WiFi, Bluetooth, etc. Accordingly, while from an overhead perspective it might be desirable to advertise information in the LTED coverage area, it can also be desirable that the advertised information not be information which changes rapidly. Furthermore, from the perspective of macro network resource utilization, it may be desirable if, even though some information may be advertised using macro network resources, if the bulk of the information, and particularly highly time varying information, could be provided to devices with little or no use of macro network communications resources.

In view of the above discussion, it should be appreciated that it would be desirable if methods and/or apparatus could be developed which allow the use of some information to be advertised using macro network resources, e.g., LTED resources, but did not require extensive use of such resources or management overhead associated with advertising information via macro network resources, to communicate rapidly changing information.

SUMMARY

Methods and apparatus are described to efficiently wirelessly advertise dynamic time-varying data. Various described methods and apparatus are well suited for supporting wireless discoverable services that may wish to advertise dynamic (i.e., time-varying) data.

In various embodiments first, e.g., macro network resources are used to advertise static information, slowing changing information and/or information which can be used to obtain time varying information via resources of another network, e.g., a local area network. For example, LTED may be used to communicate information about a store and to provide an identifier or other information that can be used to access time varying information corresponding to the store which is not advertised via the LTED network. By offloading the operations associated with managing and/or accessing the time varying data to the local network, use of macro network communications and management resources is limited but the macro network and its signaling, e.g., LTED beacons, can still be used to make devices aware of the availability of the time varying information and facilitate access of such information.

Examples of time varying data which may be wirelessly advertised include: a current queue length, a current inventory, current parking spot availability, and mobile proximate game information. In one example, an airport coffee shop wireless device is the source of advertising current queue length. In another example, a mobile snack/beverage vendor wireless device is the source of advertising current inventory. In another example, a smart city public parking wireless device is the source of advertising current parking spot availability information. In still another embodiment, a wireless device corresponding to mobile proximate game player is the source of advertising current player level, currency available, game items possessed, etc.

Various novel methods and apparatus, exploit the standardization of LTED and the direct data communication of device-to-device (D2D) wireless technologies like WiFi and BT/BLE to discover and access dynamic data while minimizing cellular traffic. In various embodiments, two different wireless communications networks, e.g., which communicate different beacons communicate different identifiers, are used in conjunction to communicate information. In some such embodiments, a first beacon communicates a first identifier, e.g., an OTAC code, which maps to information describing available time varying data. In some such embodiments, a second beacon communicates a second identifier, e.g., a hash value, corresponding to the first time varying data.

Methods and apparatus for supporting efficient communications of time varying data are described. A wireless device monitors to detect receipt of a first identifier, e.g., an LTED OTACode, via a first network interface, e.g., an LTED interface, said first identifier corresponding to first information that is available via the first network, said first information indicating a source of first time varying data and a description of the first time varying data. The wireless device further monitors to detect receipt of a second identifier, e.g., a hash value, via a second network interface, e.g., a WIFI, BT or BLE network interface, the second identifier corresponding to the first time varying data which is available via the second network. The wireless device determines if the first identifier was received on the first interface and if a second identifier, corresponding to the first identifier, was received on the second interface. The wireless device makes a decision whether or not to retransmit the second identifier based on the determination as to whether or not the first and second identifiers were received on corresponding first and second interfaces, and optionally based on distance information indicating distance, e.g., in terms of number of hops, from a provider of the time varying information and/or second identifier propagation information, e.g. maximum propagation distance for propagating the second identifier in terms of number of hops, which was received with the second identifier. The wireless device retrieves and caches the first time varying information for its own use and/or to supply the first time varying data to other devices.

An exemplary method of operating a communications device to communicate information, in accordance with some embodiments, includes: monitoring to detect receipt of a first identifier via a first network interface corresponding to a first network, said first identifier corresponding to first information that is available via the first network, said first information indicating a source of first time varying data and a description of the first time varying data and monitoring to detect receipt, via a second network interface, of a second identifier corresponding to the time varying data available via the second network; determining if the first identifier was received on the first interface; determining if the second identifier corresponding to the first identifier was received on the second interface; and making a decision whether or not to retransmit the second identifier based on said determination as to whether the first and second identifiers were received on the corresponding first and second interfaces.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 7B illustrates a second part of an exemplary assembly of modules which may be included in an exemplary wireless device in accordance with an exemplary embodiment.

FIG. 7 comprises the combination of FIG. 7A and FIG. 7B.

FIG. 10A is a first part of a flowchart of an exemplary method of operating a communications device, e.g. a wireless device, to communicate information in accordance with an exemplary embodiment.

FIG. 10 comprises the combination of FIG. 10A, FIG. 10B, FIG. 10B, FIG. 10D and FIG. 10E.

DETAILED DESCRIPTION

Figure 1:
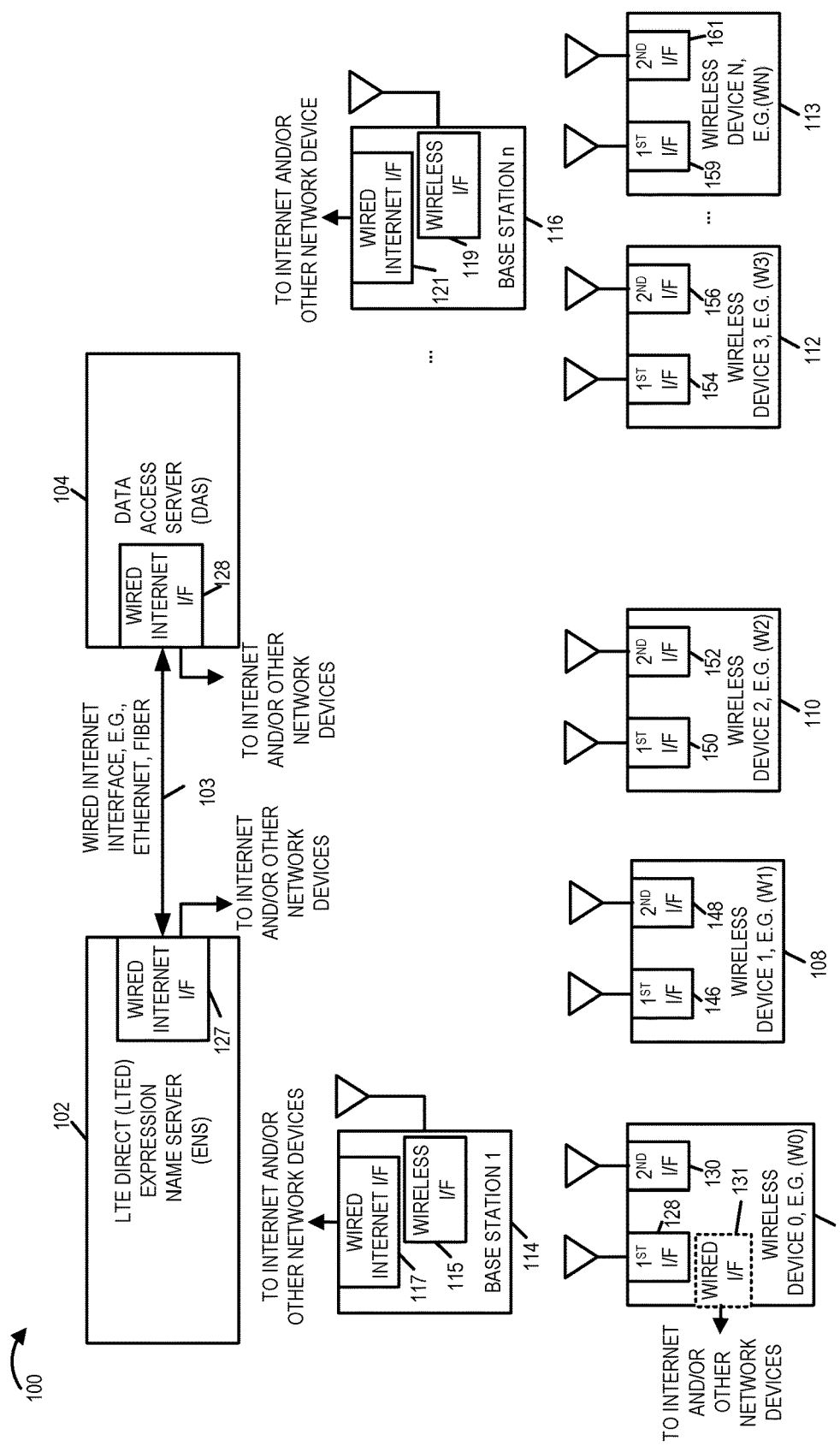
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes an LTE direct (LTED) expression name server (ENS) 102, a data access server (DAS) 104, a plurality of base stations (base station 1 114, . . . , base station n 116) and a plurality of wireless devices (wireless device 0 (W0) 106, wireless device 1 (W1) 108, wireless device 2 (W2) 110, wireless device 3 (W3) 112, . . . , wireless device N (WN) 113). The base stations (114, . . . , 116) includes a wireless interface (115, . . . , 119), respectively, and a wired interface (117, . . . , 121), respectively. The wireless interfaces (115, . . . , 117), are e.g., cellular and/or WIFI interfaces. The wired interfaces (117, . . . , 114) couple the base stations (114, . . . , 116) to the Internet and/or other network devices. LTED ENS 102 and DAS 104 each include a wired interface (127, . . . , 128), which couples the devices to the Internet and/or other network devices. LTE ENS 102 is coupled to DAS 104 via wired Internet interface link 103, e.g., an Ethernet or fiber link, over which the devices (102, 104) may exchange data and information.

The wireless devices ($W_0$ 106, $W_1$ 108, $W_2$ 110, $W_3$ 112, . . . , $W_N$ 113) includes a first network interface (128, 146, 150, 154, . . . , 159), and a second network interface (130, 148, 152, 156, . . . , 161), respectively. In some embodiments, the first interface is a LTED interface and the second interface is one of: a WIFI interface, a Bluetooth (BT) interface, or a Bluetooth Low Energy (BLE) interface. In some embodiments, some of the wireless devices, e.g., W0 106, includes a wired interface, e.g., wired interface 131, which couples the wireless devices to the Internet and/or other network nodes.

The wireless devices (106, 108, 110, 112, . . . , 113) are, e.g., user devices (UEs). At least some of the wireless devices (106, 108, 110, 112, . . . , 113) are mobile devices. Exemplary wireless devices (106, 108, 110, 112, . . . , 113) include smartphone, tablet with wireless capability, personal computer with wireless capability, vehicle with wireless capability, a smart city object, e.g., a parking meter with wireless capability, a traffic light with wireless capability, etc. The wireless devices (106, 108, 110, 112, . . . , 113) include the capability to transmit and receive first type wireless beacons over the first interface and the capability to transmit and receive second type wireless beacons over the second interface. In some embodiments, LTE direct beacons are transmitted and received over the first interfaces. In some such embodiments, one of WIFI, BT, or BTE beacons are transmitted and received over the second interfaces. The wireless devices (106, 108, 110, 112, . . . , 113) also include device to device data communications capability, e.g., over the second interfaces.

Various terminologies, which is used in some embodiments, are described below.

$W_i$: Exemplary wireless device i, e.g., $W_0$ 106 of Figure where i=0; $W_1$ 108 of FIG. 1, where i=1, etc.

d: A time-varying data value, sometimes referred to as first time varying data.

The value of d at time t is given by d(t).

$e_d$: An LTED expression that describes d, sometimes referred to as first information.

$c_d$: The OTACode assigned by the LTED ENS that resolves to $e_d$, sometimes referred to as the first identifier.

$a_d$: A data structure including the following attributes configured by the device providing d (i.e., the provider or original source) used by the DAS to facilitate access of d.

Hop limits: A key-value map containing the following attributes.

Network (key): A D2D network interface (e.g., WiFi, BT, BLE).

Hop limit (value): An integer indicating the maximum logical distance from the provider on the corresponding network interface that d may be advertised.

Internet connectivity: An integer representing the type of network on which the provider has internet connectivity, if at all (e.g., 0—none, 1—cellular, 2—non-cellular [WiFi, Ethernet, etc.])

Data size: An integer representing the size of the data value payload in bytes.

Data dynamic level: An integer representing how often d changes (e.g., 0—every 30 seconds, 1—every minute, 2—every 5 minutes, etc.)

Device mobility level: An integer representing the expected mobility the provider (e.g., 0—stationary, 1—pedestrian slow, 2—pedestrian fast, 3—bicycle, 4—car city, 5—car highway, etc.)

Device power type: 0—grid power, 1—battery power (short life), 2—battery power (long life)

Listening IP addresses: Public IP address(es) and port(s) at which d may be accessed if desired by the provider.

Extras: A key-value map in which the provider can place arbitrary key-value mappings for application specific purposes (e.g., keywords).

$h_d$: A hash code assigned by the DAS that resolves to $a_d$, sometimes referred to as the second identifier.

The second information, ad, is used by the DAS; ad is generated by a source of the first time varying data d; ad describes (i) the dynamic characteristics of d, e.g., how often d changes, and (ii) characteristics of the source of the first time varying data, e.g., mobility level, power sources, Internet accessibility. In various embodiments, ad is used by a server, e.g., a DAS, to determine one or more methods for accessing time varying data d. hd is used by a device, e.g., a wireless device, and the server, e.g., the DAS, to access first time varying data d via one of more methods.

In some embodiments, there may be, and sometimes are, many $c_d$s that map to the same $h_d$. There is a 1:1 mapping of $c_d$:$e_d$. There is a 1:1 mapping of $h_d$:d. In some embodiments, an association between a particular $c_d$ and $h_d$ is made when that $h_d$ is included in the $e_d$ that maps to the $c_d$. In some embodiments, one $h_d$ may correspond to multiple $c_d$s, For example, an even slight different set first information $e_d$ in LTED results in a different expression identifier $c_d$. Multiple $e_d$s, each including the same $h_d$ but including some different information map to different $c_d$s.

Figure 2:
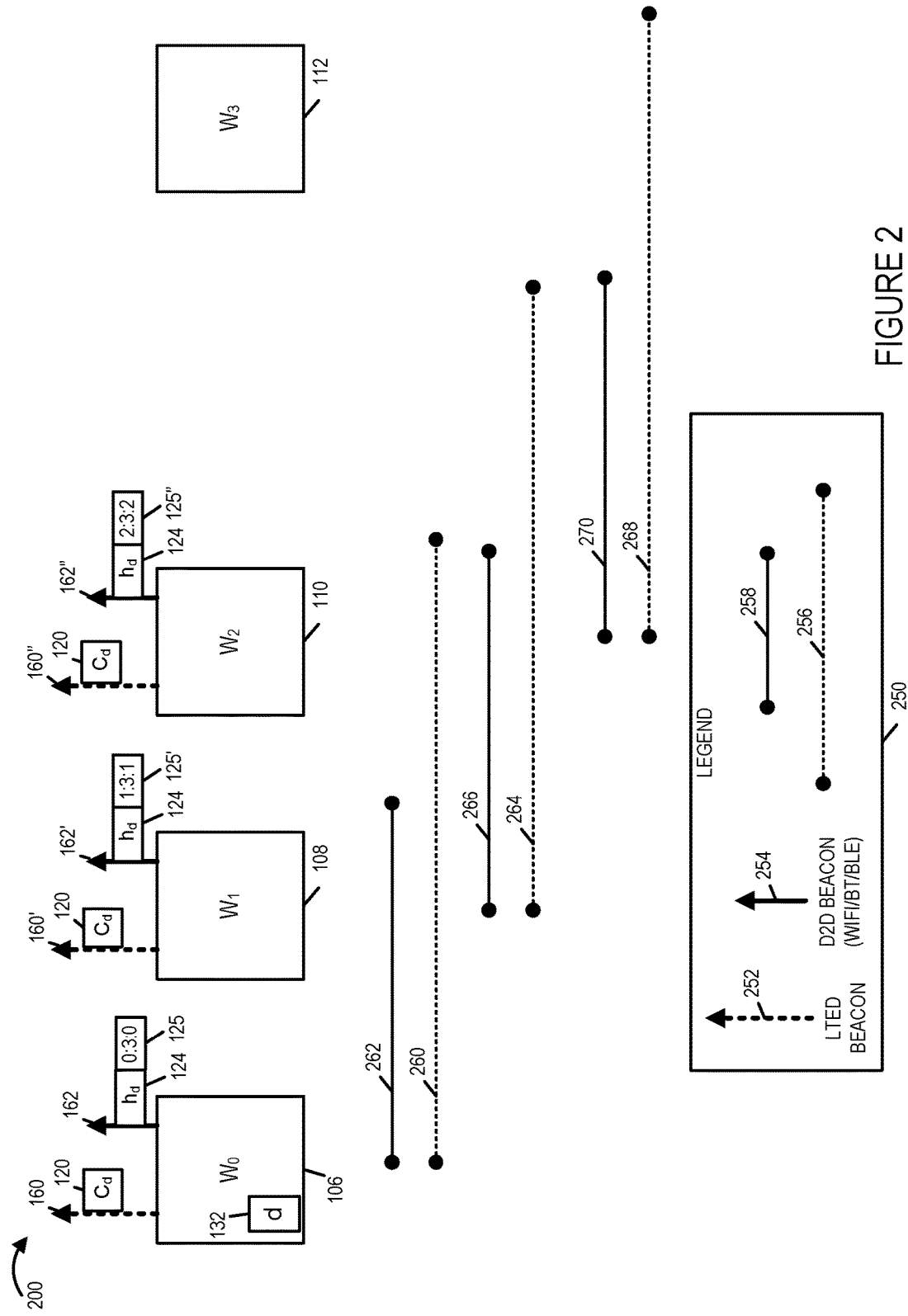
FIG. 2 is a drawing used to explain an example of communicating information in accordance with an exemplary embodiment.

FIG. 2 is a drawing 200 used to explain an example of communicating information in accordance with an exemplary embodiment. Drawing 200 illustrates wireless devices ($W_0$ 106, $W_1$ 108, $W_2$ 110 and $W_3$ 112) of system 100 of FIG. 1, which are located at separation distances as shown in FIG. 2. Legend 250 element 252 indicates that a dotted line arrow represents a LTED beacon. Legend 250 element 254 indicates that a solid line arrow indicates a D2D beacon, e.g., a WIFI beacon, BT beacon or BLE beacon. Legend 250 element 256 indicates that a dotted line with two endpoints is used to indicate the D2D (WiFi, BT, or BLE) beacon range. Legend 250 element 258 indicates that a solid line with two endpoints is used to indicate the LTED beacon range.

Line 260 indicates that $W_1$ 108 is within the range to successfully receive and recover a LTED beacon transmitted from $W_0$ 106; line 262 indicates that $W_1$ 108 is within the range to successfully receive and recover a D2D beacon transmitted from $W_0$ 106. Line 264 indicates that $W_2$ 110 is within the range to successfully receive and recover a LTED beacon transmitted from $W_1$ 108; line 266 indicates that $W_2$ 110 is within the range to successfully receive and recover a D2D beacon transmitted from $W_1$ 108. Line 268 indicates that $W_3$ 112 is within the range to successfully receive and recover a LTED beacon transmitted from $W_2$ 110; line 270 indicates that $W_3$ 112 is within the range to successfully receive and recover a D2D beacon transmitted from $W_2$ 110.

In this example, device $W_0$ 106 is the provider, e.g., original source, of a time-varying data value d 132. First, $W_0$ 106 creates and specifies $a_d$, which provides the DAS 104 with metadata that facilitates efficient remote access of d. Next, $W_0$ 106 registers itself, if necessary, and $a_d$ with the DAS 104. The DAS 104 generates a hash $h_d$124 that it can resolve to $a_d$ and returns $h_d$ 124 to $W_0$ 106.

Next, $W_0$ 106 may create and publish an LTED expression $e_d$, which includes $h_d$ 124 as a scalar. The LTED local middleware registers $e_d$ at the LTED ENS 102, which generates and returns an OTACode $c_d$ 120. To make d discoverable, $W_0$ beacons $c_d$ 120 on its LTED interface 128, via LTED beacon 160, and $h_d$ 124 on any Wireless D2D Data interfaces, e.g., WiFi, BT, BLE, interface 130, via D2D beacon 162. To indicate the logical distance of $h_d$ from d, $W_0$ 106 also includes the hop count and hop limit of $h_d$ in the Wireless D2D Data beacon 160 as well as a hop count from the closest cached copy of d (if applicable), in information triplet 125 in D2D beacon 162. Devices in both LTED range of $c_d$ and single-hop D2D Data range of a device beaconing $h_d$ ($W_1$ 108 and $W_2$ 110) will re-beacon both $c_d$ (via LTED interface (146, 150)), as part of LTED beacons (160' and 160''), respectively, and $h_d$ (via D2D Data interface (148, 152)), as part of D2D beacons (162' and 162''), respectively. The D2D beacons (162', 162'') including $h_d$ will include the received hop count plus one and the static hops remaining, as part of information triplet (125', 125''), respectively. To access d, devices in D2D Data range of the provider, e.g., $W_1$ 108 and $W_2$ 110, will utilize the shortest D2D Data route, given by the local hop count assessment.

Devices not in D2D range of the provider, e.g., $W_3$ 112, utilize the DAS 104 if an Internet connection is available.

Figure 3:
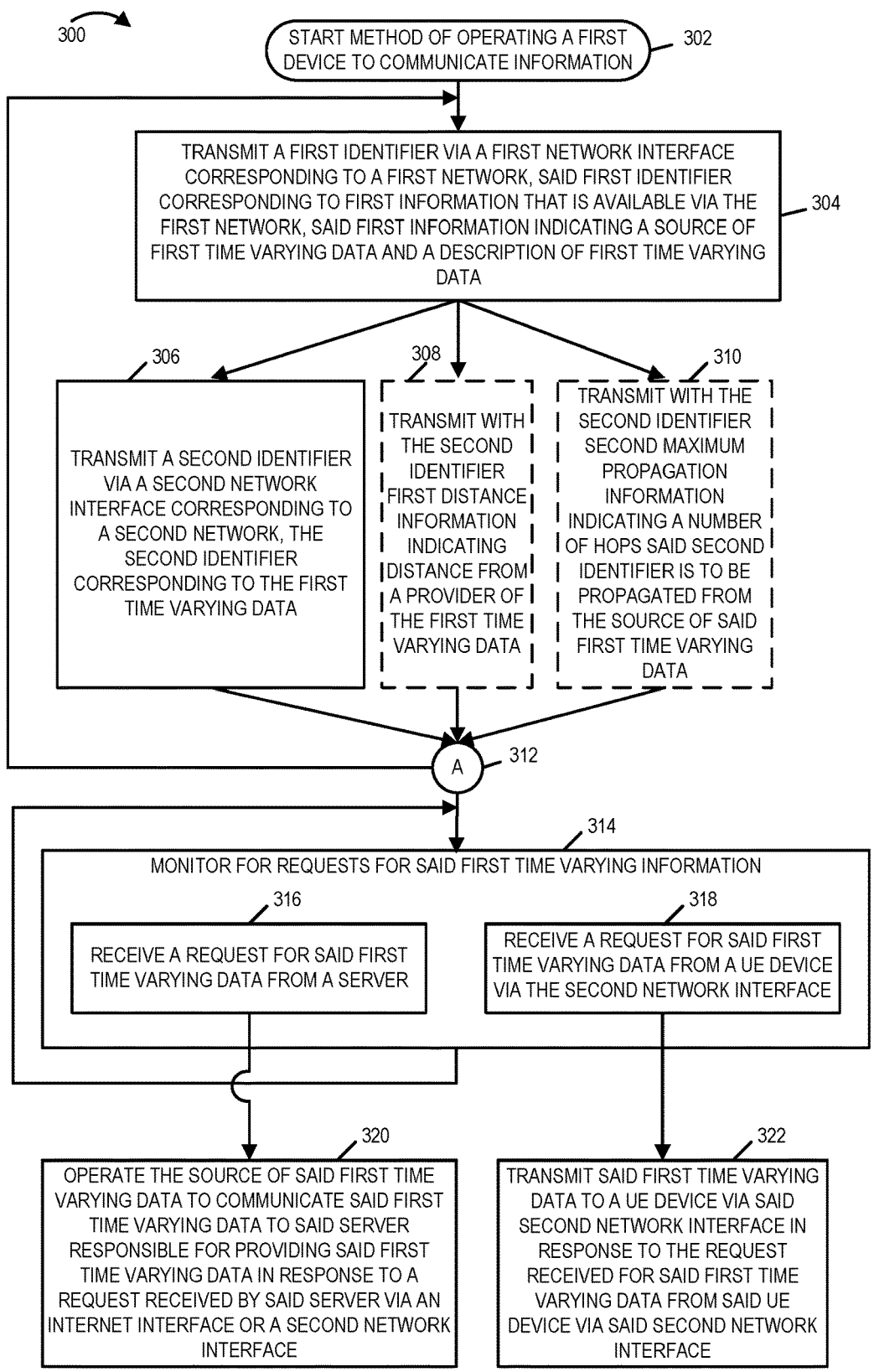
FIG. 3 is a flowchart of an exemplary method of operating a first wireless device to communicate information in accordance with an exemplary embodiment.

FIG. 3 is a flowchart 300 of an exemplary method of operating a first device, e.g., $W_0$ 106 or $W_0$ 406, to communicate information in accordance with an exemplary embodiment. In some embodiments, the exemplary method of flowchart 300 may be performed by a wireless device, e.g., $W_0$ 106 of FIG. 1 and FIG. 2 or $W_0$ 406 of FIG. 4 and FIG. 5, which is the source of first time varying data. Operation of the exemplary method starts in step 302 in which the first device is powered on and initialized. Operation proceeds from step 302 to step 304.

In step 304 the first device transmits a first identifier, e.g., $C_d$, via a first network interface, e.g., a LTED interface, corresponding to a first network, said first identifier, e.g., $C_d$, corresponding to first information, e.g., $e_d$, that is available via the first network, said first information indicating a source of first time varying data, e.g., d, and a description of first time varying data. In various embodiments, the first device is the original source of the first time varying data, e.g., the original source of d. The description is, e.g., what the first time varying data represents or indicates. Operation proceeds from step 304 to step 306. In some embodiments, operation also proceeds to one or both of optional steps 308 and 310.

In step 306 the first device transmits a second identifier, e.g., $h_d$, via a second network interface, e.g., a WIFI interface, corresponding to a second network, the second identifier, e.g., $h_d$, corresponding the first time varying data, e.g., d.

In some embodiments, the first time varying data, e.g. d, is data which is available to other devices via the second network, e.g., either from the first device or from devices or servers which store the first time varying data provided by the first device.

In some embodiments, the second identifier is different from the first identifier, e.g., $c_d$ is different from $h_d$.

In some embodiments, the second identifier, e.g., $h_d$, also corresponds to second information, e.g., $a_d$, which is available via the second network, said second information relating to said first time varying data and describing dynamic characteristics of the first time varying data. In some embodiments, the second identifier, e.g., $h_d$, also corresponds to second information, e.g., $a_d$, which is available via the second network, said second information, e.g., $a_d$, being data that was generated by a source of the first time varying data and which describes the rate of change of the first time varying data, e.g. the rate of change of d. In some embodiments, the second identifier, e.g., $h_d$, also corresponds to second information, e.g., $a_d$, that provides information about the characteristics of the source of the first time varying data. In some such embodiments, the characteristics of the source of the first time varying data include at least one of: mobility level, power source or Internet accessibility. In some embodiments, the second identifier also corresponds to second information, e.g., $a_d$, that describes dynamic characteristics of the first time varying data and provides information about characteristics of the source of the first time varying data.

In some embodiments, the first network interface has a longer transmission range than the second network interface. In some embodiments, the first identifier is assigned by a first network entity, e.g., a LTED ENS, responsible for providing said first information, e.g., $e_d$, in response to a resolution request sent over the first network. In some such embodiments, the first information, e.g., $e_d$, and the first identifier, e.g., $c_d$, are static and remain unchanged during a first period of time during which the first time varying data, e.g., d, changes. In some embodiments, the first information, e.g., $e_d$, includes the second identifier, e.g., $h_d$. In some embodiments, the first network is a network from which said first time varying data is not available, e.g., the LTED network does not provide the first time varying data but allows devices to obtain information indicating that the first time varying data is available and information indicating where it can get the first time varying data, e.g., via the second network using $h_d$.

In some embodiments, the first network is a network which includes one or more devices which broadcast expression identifiers which can be resolved to other information using information mapping expression identifiers to expressions, said first identifier, e.g., $c_d$, being an expression identifier transmitted on the first network which resolves to said first information, e.g., $e_d$. In some embodiments said first information, e.g., $e_d$, is an LTED expression and the first identifier, e.g., $c_d$, which is broadcast in the first network, is resolved to the first information via the second network, i.e. at the LTED ENDS via the Internet. Thus, in various embodiments, the actual LTED expressions are not broadcast in the first network, but their identifiers are broadcast in the first network; the actual LTED expressions are communicated via the Internet.

In some embodiments, the first network interface is a device to device cellular network interface, e.g., a LTED interface, and the second network interface is a non-cellular device to device network interface, e.g., a WiFi network interface, a BT interface or a BLE interface.

In step 308 the first device transmits, with the second identifier, e.g., with $h_d$, first distance information indicating distance, e.g., in terms of number of hops, from a provider of the first time varying data. In some embodiments, the first distance information is one of a number of hops to the source, e.g., $W_0$, of said first time varying information or a number of hops to a device including a valid copy of said time varying information, e.g., a device which cached the first time varying data, e.g., perhaps device $W_1$ including a stored valid copy of first time varying data d.

In step 310 the first device transmits with the second identifier, e.g., with $h_d$, second maximum propagation information indicating a number of hops said second identifier is to be propagated from the source, e.g., from $W_0$, of the first time varying data.

In one exemplary embodiment, the second identifier, e.g., $h_d$, is transmitted along with a triplet; the first value of the triplet indicating distance information to the source of the first time varying information, e.g., in number of hops; the second value of the triplet indicating maximum propagation information, e.g., indicating a number of hops said second identifier is to be propagated from the source of the first time varying data; and the third value of the triplet indicating distance indication to a nearest device including a valid copy of said first time varying data, e.g., a number of hops to a device including a valid copy of said time varying information, e.g., a device which cached the first time varying data and includes a stored valid copy of first time varying data d.

In some embodiments, the first time varying data, e.g., d, is data which is available to other devices via the second network, e.g., either from the first device or from devices or servers which store the first time varying data provided by the first device. In various embodiments the first identifier, e.g., $c_d$, is different from the second identifier, e.g., $h_d$.

In some embodiments, the first device transmits the first time varying data, e.g., d, along with the second identifier, e.g., $h_d$, on the second network interface. This approach will enable devices that do not possess a first network interface, e.g., a LTED interface, to participate in searching for and accessing first time varying data d. In some embodiments, a device may, and sometimes does, retransmit $h_d$ on the second network interface even if it has not received $c_d$ on the first network interface.

Operation proceeds from step 306, and, in some embodiments, step 308 and/or step 310, via connecting node A 312, to step 304, for another transmission of the first identifier via the first network interface and to step 314.

In step 314 the first device monitors for request for said first time varying data. Step 314 is repeated on an ongoing basis. The monitoring of step 314 may, and sometimes does, detect a request for first time varying data.

In step 316 the first device receives a request for said first time varying data from a server, e.g., a DAS. The received request was sent from the server following receipt by said server of a request for said first time varying data from another device, e.g., a UE device, e.g., $W_3$. In some embodiments, the request received by the server included the second identifier, e.g., $h_d$. Operation proceeds from step 316 to step 320 in response to the received request for said first time varying data from said server. In step 320 the first device, e.g., $W_0$, which is the source of the first time varying data, communicates said first time varying data to the server, e.g., a DAS, responsible for providing said time varying data in response to a request received by said server via an Internet interface or a second network interface. The server, e.g., the DAS, may reside anywhere in the Internet or the second network.

In step 318 the first device receives a request for said first time varying data from a UE device, e.g., another wireless device, e.g., $W_1$, via the second network interface. Operation proceeds from step 318 to step 322 in which the first device transmits said first time varying data to the UE device, e.g., to $W_1$, in response to the request received for said first time varying data from the UE device via the second network interface. In some embodiments, the request received from the UE device includes the second identifier, e.g., $h_d$. In various embodiments, the request received for the second time varying data from the UE device is from a device, e.g., $W_1$, acting as a relay device for another UE device, e.g., $W_2$, seeking said first time varying data.

Figure 4:
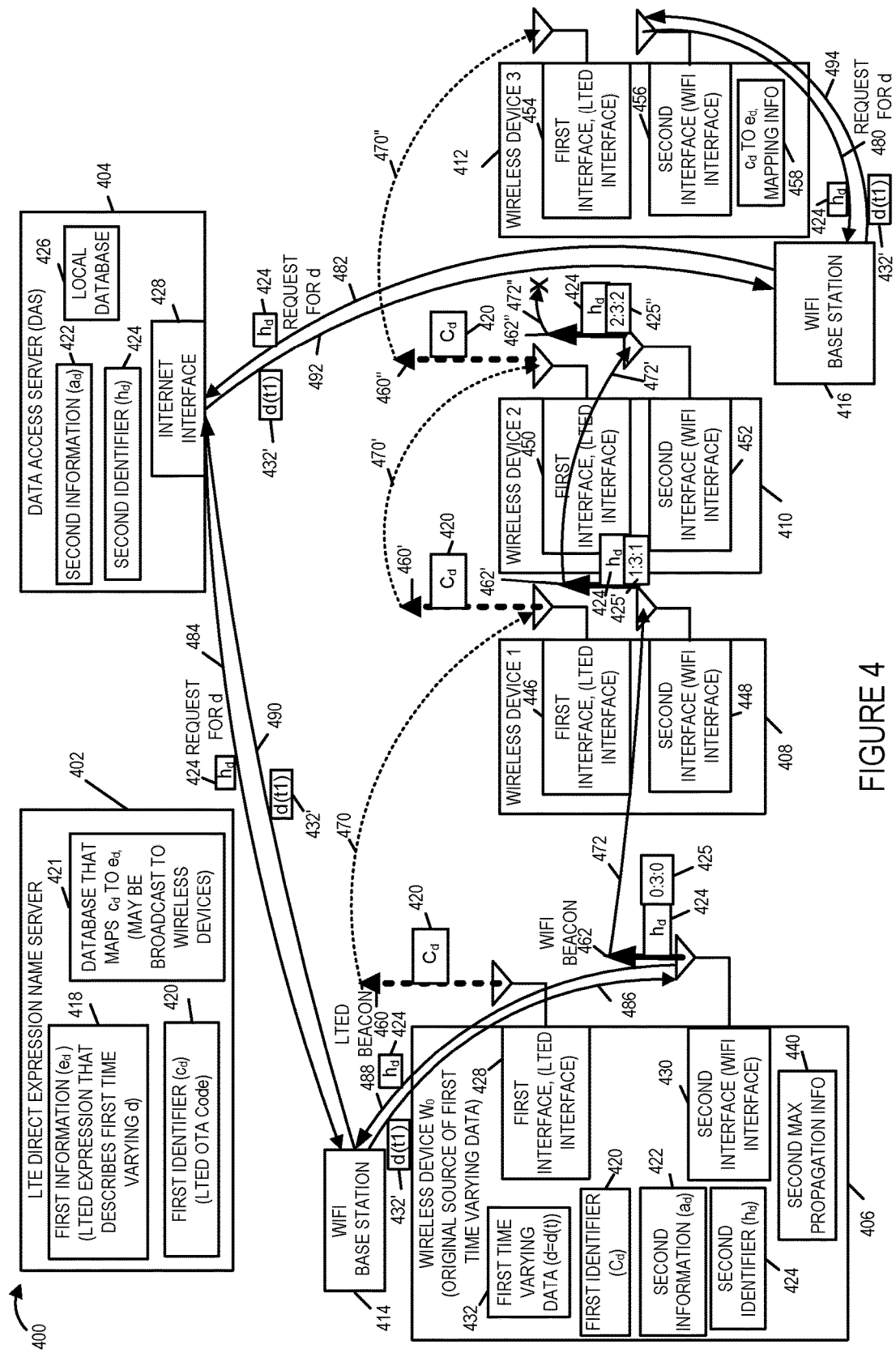
FIG. 4 is a drawing illustrating an exemplary communications system and exemplary signaling in accordance with an exemplary embodiment.

FIG. 4 is a drawing 400 illustrating an exemplary communications system and exemplary signaling in accordance with an exemplary embodiment. The exemplary communications system includes a LTE direct (LTED) expression name server 402, a data access server (DAS) 404, a plurality of wireless devices including wireless device 0 ($W_0$) 406, wireless device 1 ($W_1$) 408, wireless device 2 ($W_2$) 410, and wireless device 3 ($W_3$) 412. The exemplary communications system further includes a plurality of WIFI base stations including WIFI base station 416 and WIFI base station 418, which may couple a wireless device, including WIFI capability, in its vicinity to the Internet. In one embodiment, devices (402, 404, 406, 408, 410, 412) of FIG. 4 are devices (102, 104, 106, 108, 110, 112) of FIGS. 1-2.

LTE direct expression name server 402 includes a plurality of sets of information and corresponding identifiers including first information ($e_d$) 418, which is a LTED expression that includes information describing first time varying data (d) 432 and a first identifier ($c_d$) 420. The first identifier $c_d$ 420 is an LTED OTA code corresponding to first information $e_d$ 418. LTE direct expression name server 402 further includes a database 421 including information that maps $c_d$ to $e_d$. The database 421 including mapping between LTED expressions and LTED OTA codes may be broadcast to the wireless devices and/or communicated to the wireless devices in response to requests, e.g., over the Internet.

Data access server (DAS) 404 includes second information ($a_d$) 422, second identifier ($h_d$) 424, an Internet interface 428 and a local database 426.

Wireless device 0 (W0) 406 includes a first interface 428, which is a LTED interface, and a second interface 430, which is a WIFI interface. Wireless device 0 ($W_0$) 406 includes second information ($a_d$) 422, second identifier ($h_d$), first identifier ($c_d$) 420, second maximum propagation information 440 and first time varying data (d) 432. Second information ($a_d$) 422 includes, e.g., (i) information about the dynamic characteristics of first time varying data d, e.g., how often it changes, and (ii) characteristics of the source of first time varying data (d), e.g., mobility level, power source, and Internet accessibility information, is generated by $W_0$ 406 and is communicated to and used by DAS 404. Second identifier ($h_d$), corresponds to the first time varying data (d) 432, and was generated by the DAS 404 and communicated to wireless device 0 ($W_0$) 406.

Wireless device 1 (W1) 408 includes a first interface 446, which is an LTED interface, and a second interface 448, which is a WIFI interface. Wireless device 2 (W2) 410 includes a first interface 450, which is an LTED interface, and a second interface 452, which is a WIFI interface. Wireless device 2 (W3) 412 includes a first interface 454, which is an LTED interface, and a second interface 456, which is a WIFI interface.

Consider that the range of an LTED beacon is greater than the range of a WIFI beacon. Further consider the $W_1$ 408 is close enough to $W_O$ 406 to be able to receive both LTED and WIFI beacons from $W_O$ 406; $W_2$ 410 is close enough to $W_1$ 408 to be able to receive both LTED and WIFI beacons from $W_1$ 410; and $W_3$ 412 is close enough to $W_2$ 410 to be able to receive a LTED beacon from $W_2$ 410, but $W_3$ 412 is too far away from $W_2$ 410 to be able to receive a WIFI beacon from $W_2$.

Wireless device 0 ($W_0$) 406, which the original source of first time varying data (d) 432, transmits LTED beacon 460 including first identifier ($c_d$) 420, via first interface 428. Wireless device 0 ($W_0$) 406, also transmits WiFi beacon 462 including second identifier ($h_d$) 424 and an information triplet 425, via second interface 430. Information triplet 425 is 0:3:0. The first value of the triplet 425, is 0, indicating that the distance to the source of time varying data from the device which transmitted beacon 462 is 0 hops. The second value of the triplet 425, is 3, conveying second maximum propagation information 440, e.g., a hop limit of 3. The third value of the triplet 425, is 0 indicating that the distance to the nearest wireless device including a valid copy of the time varying data d, e.g., either the original data or a locally cached copy of the data, is 0 hops from the device which transmitted beacon 462.

Wireless device 1 408 receives both LTED beacon 460 and WIFI beacon 462, as indicated by arrows 470 and 472, respectively. Wireless device 1 408 updates the triplet 425 and generates new triplet 425', which is 1:3:1. Wireless device 1 ($W_1$) 408, transmits LTED beacon 460' including first identifier ($c_d$) 420, via first interface 446. Wireless device 1 ($W_1$) 408, also transmits WiFi beacon 462' including second identifier ($h_d$) 424 and information triplet 425', via second interface 448.

Wireless device 2 410 receives both LTED beacon 460' and WIFI beacon 462', as indicated by arrows 470' and 472', respectively. Wireless device 2 410 updates the triplet 425' and generates new triplet 425", which is 2:3:2. Wireless device 2 ($W_2$) 410, transmits LTED beacon 460" including first identifier ($c_d$) 420, via first interface 450. Wireless device 2 ($W_2$) 410, also transmits WiFi beacon 462" including second identifier ($h_d$) 424 and information triplet 425", via second interface 452.

Wireless device 3 412 receives LTED beacon 460" as indicated by arrow 470", which terminates at the antenna of wireless device 3 412. Wireless device 3 412 does not receives WIFI beacon 462" as indicated by arrow 472', which terminates short of wireless device 3 412.

Wireless device 3 412, which has stored $c_d$ to $e_d$ mapping information 458, recovers first identifier $c_d$ from received beacon 460", and uses mapping information 458 to recover information $e_d$. Information $e_d$ includes second identifier $h_d$. Wireless device 3 412 decides that it would like to receive first time varying data (d). Wireless device 3 412 sends a request signal 480 for first time varying data (d) to WiFI base station 416, the request including $h_d$ 424. WiFibase station 416 receives the request signal 480 and sends forwards the request as signal 482, via the Internet, to DAS 404, which receives the request 482, via its Internet interface 428. The DAS 404 checks in its local database 426 to see if it has a stored currently valid copy of first time varying data d corresponding to $h_d$ 424. In this example, the DAS 404 does not have a valid copy of the requested data; therefore, DAS 404 forwards the request via the Internet as signal 484, to WIFI base station 414, which is in the vicinity of wireless device 0 406. WIFI base station 414 forwards the request as signal 486. Wireless device 0 406 receives the request for said first time varying data, which was communicated from the server 404, in response to the request from wireless device 3 412. Wireless device 0 406 generates and transmits signal 486, including first time varying data at time t1 (d(t(1) 432', which is received by WiFi base station 414, forwarded via signal 490 to DAS 404, forwarded via signal 492 to WiFi base station 416 and forwarded via signal 494 to wireless device 3 412.

In another embodiment, wireless device 0 $W_0$ 406 includes an interface to the Internet, e.g., a wired Internet interface, and the request for time varying data from DAS 428 and the signal including the time varying data d(t1) 432' are communicated via the Internet without traversing WIFI base station 414.

Figure 5:
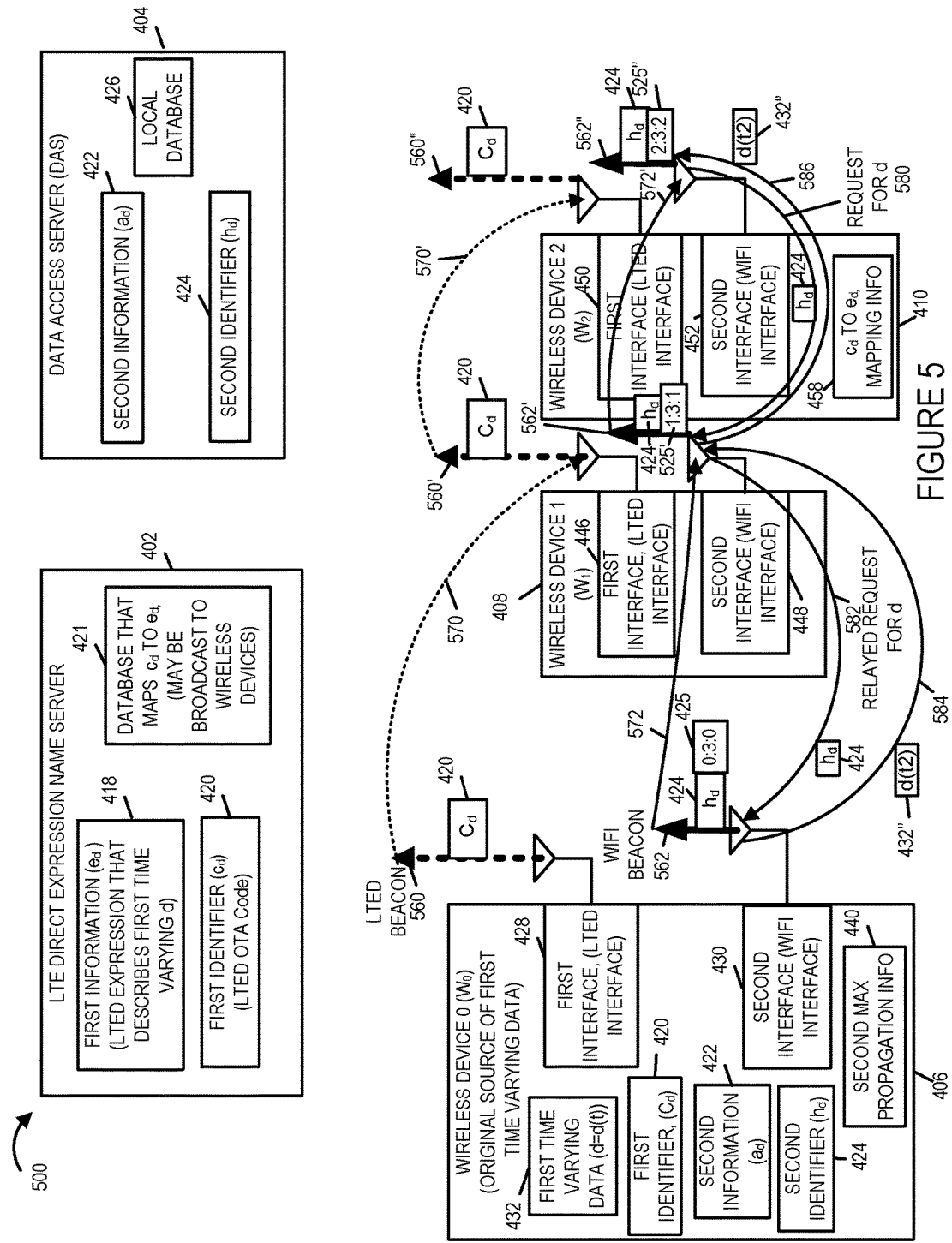
FIG. 5 is a drawing illustrating an exemplary communications system and exemplary signaling in accordance with an exemplary embodiment.

FIG. 5 is a drawing 500 illustrating an exemplary communications system and exemplary signaling in accordance with an exemplary embodiment. FIG. 5 may correspond to a different time, e.g., a later time than FIG. 4. In FIG. 5, The exemplary communications system is, e.g., the same communications system of FIG. 4 which includes a LTE direct (LTED) expression name server 402, a data access server (DAS) 404, a plurality of wireless devices including wireless device 0 ($W_0$) 406, wireless device 1 ($W_1$) 408, and wireless device 2 ($W_2$) 410.

Consider that the range of an LTED beacon is greater than the range of a WIFI beacon. Further consider the $W_1$ 408 is close enough to $W_O$ 406 to be able to receive both LTED and WIFI beacons from $W_O$ 406; $W_2$ 410 is close enough to $W_1$ 408 to be able to receive both LTED and WIFI beacons from $W_1$ 410.

Wireless device 0 ($W_0$) 406, which the original source of first time varying data (d) 432, transmits LTED beacon 560 including first identifier ($c_d$) 420, via first interface 428. Wireless device 0 ($W_0$) 406, also transmits WiFi beacon 562 including second identifier ($h_d$) 424 and an information triplet 425, via second interface interface 430. Information triplet 425 is 0:3:0. The first value of the triplet 425, is 0, indicating that the distance to the source of time varying data from the device which transmitted beacon 462 is 0 hops. The second value of the triplet 425, is 3, conveying second maximum propagation information 440, e.g., a hop limit of 3. The third value of the triplet 425, is 0 indicating that the distance to the nearest wireless device including a valid copy of the time varying data d, e.g., either the original data or a locally cached copy of the data, is 0 hops from the device which transmitted beacon 462.

Wireless device 1 ($W_1$) 408 receives both LTED beacon 560 and WIFI beacon 562, as indicated by arrows 570 and 572, respectively. Wireless device 1 ($W_1$) 408 updates the triplet 425 and generates new triplet 525', which is 1:3:1. Wireless device 1 ($W_1$) 408, transmits LTED beacon 560' including first identifier ($c_d$) 420, via first interface 446. Wireless device 1 ($W_1$) 408, also transmits WiFi beacon 562' including second identifier ($h_d$) 424 and information triplet 525', via second interface 448.

Wireless device 2 ($W_2$) 410 receives both LTED beacon 560' and WIFI beacon 562', as indicated by arrows 570' and 572', respectively. Wireless device 2 ($W_2$) 410 updates the triplet 525' and generates new triplet 525", which is 2:3:2. Wireless device 2 ($W_2$) 410, transmits LTED beacon 560" including first identifier ($c_d$) 420, via first interface 450. Wireless device 2 ($W_2$) 410, also transmits WiFi beacon 562" including second identifier ($h_d$) 424 and information triplet 525", via second interface 452.

Wireless device 2 ($W_2$) 410, which has stored $c_d$ to $e_d$ mapping information 458, recovers first identifier $c_d$ from received beacon 560', and uses mapping information 458 to recover information $e_d$. Wireless device 2 410 decides that it would like to receive first time varying data (d). Wireless device 2 410 sends a request signal 580 for first time varying data (d) to wireless device 1 W1 408, the request including $h_d$ 424. Wireless device 1 ($W_1$) 408 receives the request signal 580 and relays the request as transmitted relayed request for d signal 582 including second identifier ($h_d$) 424. Signal 582 is received by wireless device 0 ($W_0$) 406 via second interface 430, which is a WIFI interface. In response to the received request signal 582 for first time varying data, wireless device 0 ($W_0$) 406, generates and transmits, via second network interface 430, signal 584 including first time varying data at time t2 (d(t(2) 432". Wireless device 1 W1 408 receives signal 584 including via second interface 448. In response to the received signal 584, wireless device 1 (W1) 408, generates and transmits, via second network interface 448, signal 586 including first time varying data at time t2 (d(t(2) 432". Wireless device 2 ($W_2$) 410 receives signal 586 including via second interface 452 and recovers the first time varying data d(t2).

Figure 6:
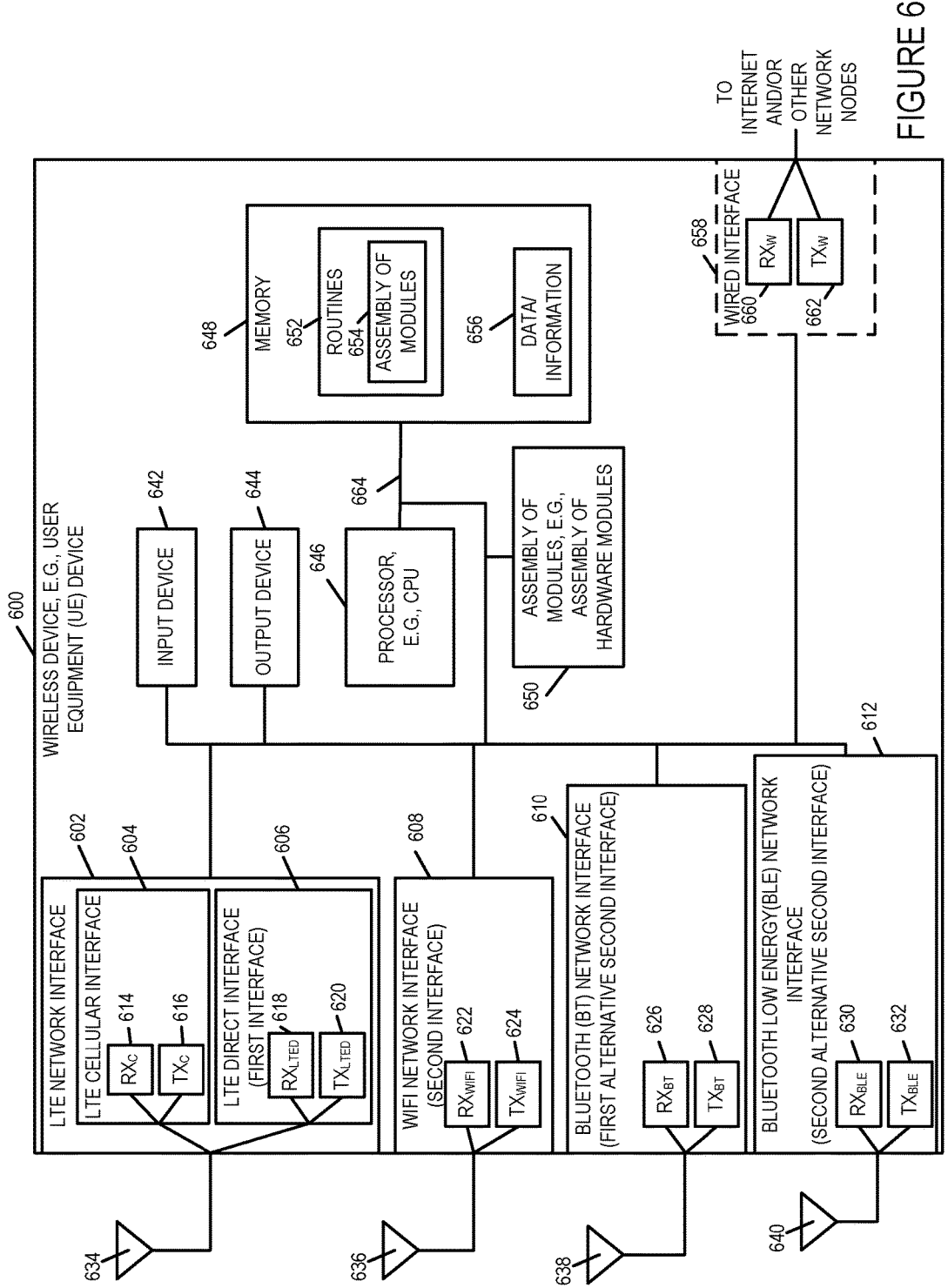
FIG. 6 illustrates an exemplary wireless device in accordance with an exemplary embodiment.

FIG. 6 is a drawing of an exemplary wireless device 600, e.g., a user equipment (UE) device, implement in accordance with an exemplary embodiment. Exemplary wireless device 600 is, e.g., one of the wireless devices ($W_0$ 106, $W_1$ 108, $W_2$ 110, $W_3$ 112, ..., $W_N$ 114) of FIG. 1 or FIG. 2, ($W_0$ 406, $W_1$ 408, $W_2$ 410, $W_3$ 412) or FIG. 3 or FIG. 4, and/or a wireless device implementing the method of flowchart 300 of FIG. 3.

Exemplary wireless device 600 includes an LTE network interface 602 including a LTE cellular interface 604 and a LTE Direct (LTED) interface 606, a WIFI network interface 608, a Bluetooth (BT) network interface 610, a Bluetooth low energy (BLE) network interface 612, an input device 642, and output device 644, a processor 646, e.g., a CPU, a memory 648, and an assembly of module 650, e.g., an assembly of hardware modules, e.g., circuits, coupled together via a bus 664 over which the various elements may interchange data and information. In some embodiments, wireless device 600 further includes a wired interface 658 coupled to bus 664.

LTE cellular interface 604 includes a cellular receiver ($RX_C$) 614 and a cellular transmitter ($TX_C$) 616 coupled to antenna 634, via which device 600 may receive and transmit cellular wireless signals, respectively. LTE direct interface 606 includes a LTE direct receiver ($RX_{LTED}$) 618 and a LTE direct transmitter ($TX_{LTED}$) 620 coupled to antenna 634, via which device 600 may receive and transmit LTE direct wireless signals, respectively. LTE direct wireless signals include LTED beacons including a LTED beacon communicating a first identifier, e.g., $c_d$.

WIFI interface 608 includes a WIFI receiver ($RX_{WIFI}$) 622 and a WIFI transmitter ($TX_{WIFI}$) 624 coupled to antenna 636, via which device 600 may receive and transmit WIFI wireless signals, respectively. WIFI wireless signals include WIFI beacons including a WIFI beacon communicating a second identifier, e.g., $h_d$, and additional information, e.g., an information triplet communicating beacon propagation information, and WIFI D2D data signals including, e.g., a request signal for time varying data d and a response signal including time varying data d.

BT interface 610 includes a BT receiver ($RX_{BT}$) 626 and a BT transmitter ($TX_{BT}$) 628 coupled to antenna 638, via which device 600 may receive and transmit BT wireless signals, respectively. BT wireless signals include BT beacons including a BT beacon communicating a second identifier, e.g., $h_d$, and additional information, e.g., an information triplet communicating beacon propagation information, and BT D2D data signals including, e.g., a request signal for time varying data d and a response signal including time varying data d.

BLE interface 612 includes a BLE receiver ($RX_{BLE}$) 630 and a BLE transmitter ($TX_{BLE}$) 632 coupled to antenna 640, via which device 600 may receive and transmit BLE wireless signals, respectively. BLE wireless signals include BLE beacons including a BLE beacon communicating a second identifier, e.g., $h_d$, and additional information, e.g., an information triplet communicating beacon propagation information, and BLE D2D data signals including, e.g., a request signal for time varying data d and a response signal including time varying data d.

In some embodiments, a different number of antenna are used and/or a different antenna configuration is used, e.g., a different antenna for receive and transmit, multiple antennas for receive and multiple antennas for transmit, the same antenna or same set of antennas for different interfaces, etc.

Wired interface 658 includes a receiver $RX_W$ 660 and a transmitter $TX_W$ 662, via which device 600 may receive and transmit signals over the Internet and/or to other network nodes, e.g., via a wired and/or fiber optic backhaul link or links.

Input device 642 includes, e.g., touch screen interface, keypad, keyboard, microphone, camera, switches, monitoring sensors, etc., via which a user of device 600 may input information and/or device 600 may autonomously or semi autonomously collect data. In some embodiments, input information and/or collected data is time varying data, which may be communicated to other devices. In some embodiments, input information and/or collected data is used to generate time varying data, which may be communicated to other devices.

Output device 644 includes, e.g., a display, a speaker, etc, for outputting data/information to a user of device 600. Memory 648 includes routines 652 and data/information 656. Routines 652 includes an assembly of modules 654, e.g., an assembly of software modules. Data/information 656 includes, second information, e.g. $a_d$, a second identifier, e.g., $h_d$, first information, e.g., $e_d$, a first identifier, $c_d$, information mapping the first identifier to first information, information mapping $h_d$ to time varying data d, maximum propagation information, a generated first beacon, a generated second beacon, a received request for time varying data, and a generated response including the requested time varying data d.

Figure 7A:
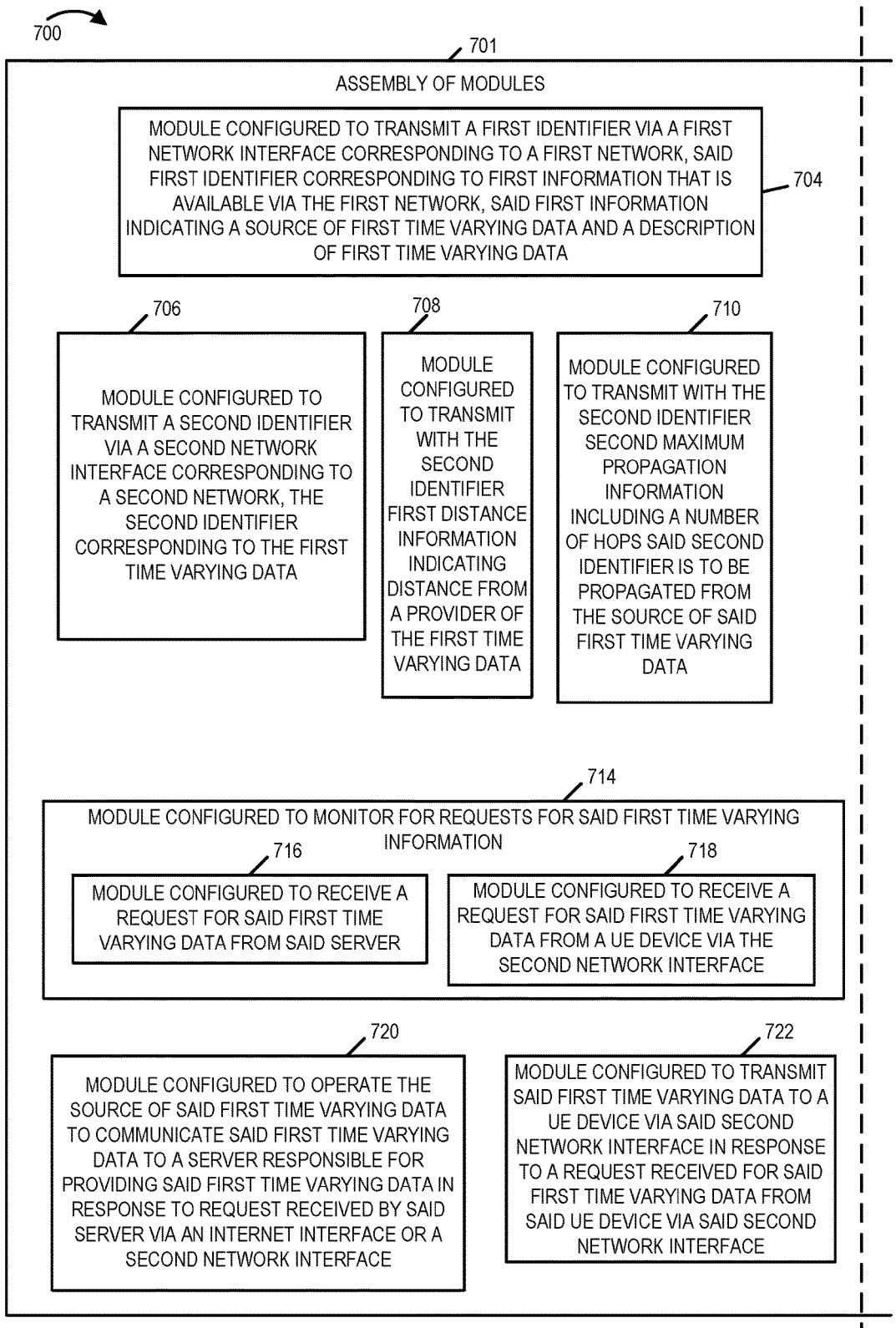
FIG. 7A illustrates a first part of an exemplary assembly of modules which may be included in an exemplary wireless device in accordance with an exemplary embodiment.

FIG. 7, comprising the combination of FIG. 7A and FIG. 7B, is a drawing of an assembly of modules 700, comprising the combination of part A 701 and part B 703, which may be included in an exemplary wireless device, e.g., wireless device 600 of FIG. 6, in accordance with an exemplary embodiment. Assembly of modules 700 which can, and in some embodiments is, used in the wireless device 600. The modules in the assembly of modules 700 can, and in some embodiments are, implemented fully in hardware within the processor 646, e.g., as individual circuits. The modules in the assembly of modules 700 can, and in some embodiments are, implemented fully in hardware within the assembly of modules 650, e.g., as individual circuits corresponding to the different modules. In other embodiments some of the modules are implemented, e.g., as circuits, within the processor 646 with other modules being implemented, e.g., as circuits within assembly of modules 650, external to and coupled to the processor 646. As should be appreciated the level of integration of modules in the processor and/or with some modules being external to the processor may be one of design choice. Alternatively, rather than being implemented as circuits, all or some of the modules may be implemented in software and stored in the memory 648 of the wireless device 600, with the modules controlling operation of wireless device 600 to implement the functions corresponding to the modules when the modules are executed by a processor, e.g., processor 646. In some such embodiments, the assembly of modules 700 is included in the memory 648 as assembly of modules 654. In still other embodiments, various modules in assembly of modules 700 are implemented as a combination of hardware and software, e.g., with another circuit external to the processor providing input to the processor 646 which then under software control operates to perform a portion of a module's function. While shown in the FIG. 6 embodiment as a single processor, e.g., computer, it should be appreciated that the processor 646 may be implemented as one or more processors, e.g., computers.

When implemented in software the modules include code, which when executed by the processor 646, configure the processor 646 to implement the function corresponding to the module. In embodiments where the assembly of modules 700 is stored in the memory 648, the memory 648 is a computer program product comprising a computer readable medium comprising code, e.g., individual code for each module, for causing at least one computer, e.g., processor 646, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the wireless device 600 or elements therein such as the processor 646, to perform the functions of corresponding steps illustrated in the method of one or more of the signaling drawing of FIGS. 2, 4, and 5, and/or 5 and/or one or more of the flowcharts of FIGS. 3 and 8, and/or described with respect to any of the Figures. Thus the assembly of modules 700 includes various modules that perform functions of corresponding steps of one or more of FIGS. 1-5 and 8.

Assembly of modules 700 includes a module 704 configured to transmit a first identifier, e.g., $c_d$, via first network interface, e.g., a LTED interface, corresponding to a first network, said first identifier, e.g., $c_d$, corresponding to first information, e.g., $e_d$, that is available via the first network, said first information indicating a source, e.g., original source, of first time varying data, e.g., d, and a description of the first time varying data, e.g., information indicating what the first time varying data represents or indicates, and a module 706 configured to transmit a second identifier, e.g., $h_d$, via the second network interface, e.g., WIFI interface, corresponding to a second network, the second identifier, e.g., $h_d$, corresponding to the first time varying data, e.g., d.

In some embodiments, the first time varying data, e.g., d, is data which is available to other devices via the second network, e.g., either from the first device, e.g., $W_0$, or from devices and/or servers which store first time varying data provided by the first device. In some embodiments, the device including assembly of modules 700 is the original source, e.g., $W_0$, of the first time varying data, e.g., d.

In various embodiments, the second identifier, e.g., $h_d$, is different from the first identifier, e.g. $c_d$. In some embodiments, the second identifier, e.g., $h_d$, also corresponds to second information, e.g., $a_d$, which is available via the second network, said second information relating to said first time varying data and describing dynamic characteristics of the first time varying data. In some embodiments, the second identifier, e.g., $h_d$, also corresponds to second information, e.g., $a_d$, which is available via the second network, said second information being data that was generated by a source of said first time varying data and which describes the rate of change of said first time varying data, e.g., rate of change of d. In some embodiments, the second identifier, e.g., $h_d$, also corresponds to second information, e.g., ad, that provides information about characteristics of the source of the first time varying data, e.g., characteristics about $W_0$. In some such embodiments, the characteristics of the source of the first time varying data, e.g., d, include at least one of: mobility level, power sources or Internet accessibility. In some embodiments, the second identifier, e.g., $h_d$, also corresponds to second information, e.g. $a_d$, that describes dynamic characteristics of the first time varying data, e.g., d, and provides information about characteristics of the source of the first time varying data.

In some embodiments, the first network is a network which includes one or more devices which broadcast expression identifiers which can be resolved to other information using information mapping expression identifiers to expressions, said first identifier, e.g., $c_d$, being an expression identifier transmitted on the first network which resolves to said first information, e.g., $e_d$. In various embodiments, the first network is a network from which said first time varying data is not available. For example, the LTED network does not provide the first time varying data, e.g., d, but allows devices to obtain information indicating that the first time varying data is available and where it can get the first time varying data, e.g., via the second network using the second identifier, e.g. $h_d$.

In some embodiments, the first network interface has a longer transmission range than the second network interface.

In some embodiments, the first identifier, e.g., $c_d$, is assigned by a first network entity, e.g., a LTED ENS, responsible for providing said first information, e.g., $e_d$, in response to a resolution request sent over the first network. In some such embodiments, the first information, e.g., $e_d$, and said first identifier, e.g., $c_d$, are static and remain unchanged during a first period of time during which the first time varying data changes. In some such embodiments, the first information, e.g., $e_d$, includes said second identifier, e.g., $h_d$.

In some embodiments, the first network interface is a device to device cellular network interface, e.g., a LTED interface, and the second interface is a non-cellular device to device network interface. In some embodiments, the second interface is one of a WIFI interface, a BT interface, or a BLE interface.

Assembly of modules 700 further includes a module 708 configured to transmit with the second identifier, e.g., $h_d$, first distance information indicating distance, e.g., in terms of number of hops, from a provider of the first time varying data, e.g., d. In some embodiments, the first distance information is one of a number of hops to the source, e.g., W0, of said first time varying data or a number of hops to a device, e.g., perhaps device W1 if it stored the first time varying data, including a valid copy of said first time varying data, e.g., a device which cached said first time varying data.

Assembly of modules 700 further includes a module 710 configured to transmit with the second identifier, e.g., with $h_d$, second maximum propagation information including a number of hops said second identifier is to be propagated from the source, e.g., $W_0$, of said first time varying data. In one exemplary embodiments, an information triplet is transmitted with the second identifier, and the first value of the information triple communicates number of hops to the source, the second value of the triplet communicates a number of hops said second identifier is to be propagated from the source of the first time varying data, and the third value of the information triplet communicates a number of hops to a device, including a valid copy of the first time varying data, e.g., the closet device in terms of number of hops including a valid copy of the first time varying data.

Assembly of modules 700 further includes a module 714 configured to monitor for requests for said first time varying information. Module 714 includes a module 716 configured to receive a request for said first time varying data from a server, and module 718 configured to receive a request for said first time varying data from a UE device via the second network interface. In various embodiments, a request for first time varying data includes the second identifier, e.g., $h_d$. Assembly of modules 700 further includes a module 720 configured to operate the source of the first time varying data, e.g., device 600 including assembly of modules 700, to communicate the first time varying data to a server responsible for providing the first time varying data in response to a request received by said server via an Internet interface or a second network interface. In some embodiments, the server is a DAS which may reside anywhere in the Internet or second network. In some embodiments, module 720 communicates said first time varying data to the server in response to a request for said first time varying data received from said server, said request from said server following receipt by said server for said first time varying data of a request for said first time varying data from another device, e.g., a UE device, e.g. $W_3$.

Assembly of modules 700 further includes a module 722 configured to transmit said first time varying data to a UE device, e.g., $W_1$, via said second network interface in response to a request received for said first time varying data from said UE device via said second network interface. In some such embodiments, the request received by the server includes the second identifier, e.g. $h_d$. In some embodiments, the request received for the first time varying data from said UE device, e.g., $W_1$, is from a device, e.g., $W_1$, acting as a relay device for another UE, e.g., $W_2$, seeking said first time varying data.

Assembly of modules 700 further includes a module 730 configured to create second information, e.g., $a_d$, which includes metadata the facilitates remote access of the first time varying data, e.g., d, a module 732 configured to send second information, e.g., $a_d$, to a data access server (DAS), a module 734 configured to register with a DAS, a module 736 configured to receive a second identifier, e.g., ha, from the DAS, which is a hash that the DAS can resolve to $a_d$, and a module 738 configured to create and publish an LTED expression, e.g., $e_d$. Module 738 includes a module 740 configured to send first information, e.g., $e_d$, to a LTED server, a module 742 configured to send the second identi-fier, e.g., $h_d$, to a LTED server, and a module 744 configured to receive a first identifier, e.g., $c_d$, e.g., an OTA Code corresponding to said first information. Assembly of modules further includes a module 746 configured to associate the first and second identifiers with the first time varying information.

Assembly of modules 700 further includes a module 748 configured to select one or more of a plurality of alternative second networks to use, e.g., WIFI, BT, and/or BLE, to communicate a second identifier, a module 650 configured to generate a first type beacon, e.g., a LTED beacon, and a module 754 configured to generate a second type beacon. Module 750 includes a module 752 configured to include a first identifier, e.g., $c_d$, in said first type beacon. Module 754 includes a WIFI beacon generation module 756 configured to generate WIFI beacons, a BT beacon generation module 758 configured to generate Bluetooth beacons, a BLE beacon generation module 760 configured to generate Bluetooth low energy beacons, a module 762 configured to include a second identifier, e.g., $h_d$, in said second type beacon, and a module 764 configured to include additional information, e.g., an information triplet, to be included with said second identifier in said second type beacon. In some embodiments, the information triplet includes 3 information fields, the first information field specifying distance from the original source of the first time varying data, e.g., in terms of number of hops, the second information field specifying the number of hops the second identifier is to propagated from the source of the first time varying data, and the third identifier specifying a distance from the a copy of the first time varying data, e.g., original source copy at source, or duplicate cached copy at another wireless device, of the first time varying data, e.g., in terms of number of hops.

Assembly of modules 700 further includes a module 766 configured to determine that the first time varying data, e.g., d, is being requested based on the recovered second identifier, e.g., $h_d$, in the received request signal requesting time varying data, a module 768 configured to generate a signal to be communicated to a wireless device over the second network communicating the requested time varying data, e.g. request first time varying data, e.g., d, a module 770 configured to generate a signal to be communicated, e.g., over the Internet, over a cellular interface, or over the second network, to a server, e.g., a DAS, communicating the requested time varying data, e.g., first time varying data, e.g., d, and a module 772 configured to transmit first time varying data, e.g., d, along with the second identifier, e.g., $h_d$, on the second network interface.

Figure 8:
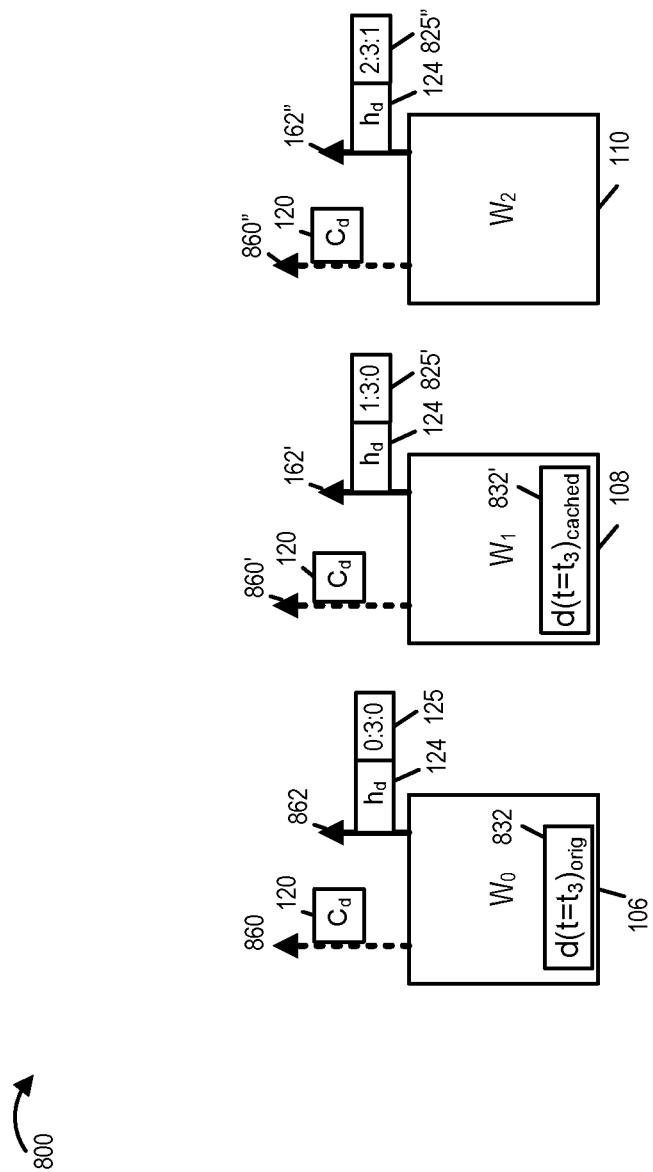
FIG. 8 is a drawing illustrating an example in which an intermediate wireless device, which may serve as a relay node, includes of a cached copy of first time varying data, in accordance with an exemplary embodiment.

FIG. 8 is a drawing 800 illustrating an example in which an intermediate wireless device, which may serve as a relay node, includes of a cached copy of first time varying data, in accordance with an exemplary embodiment. Consider that the same wireless devices ($W_0$ 106, $W_1$ 108, and $W_2$ 110), are each transmitting LTED beacons (860, 860', 860"), respectively communicating first identifier $c_d$ 120, and are each transmitting WIFI beacons (862, 862', 862"), respectively, communicating second identifier $h_d$ 124. Further consider, that in this example, $W_0$ 106 is the source of first time varying data d and includes the original version of d(t=t3)orig 832. Further consider that d(t=t3) has previously been communicated to or via $W_1$ 108, and $W_1$ 108 decided to store the data in its local cache. $W_1$ 1008 currently includes d(t=t3) cached 832'.

In beacon 862, transmitted from $W_0$ 106, information triplet 125={0:3:0}, indicating that $W_0$ 106 is 0 hops away from the original source of the first time varying data; the second identifier $h_d$ 124 is to be propagated for 3 beacon hops from the original source, and the nearest source of first time varying data is 0 hops away from $W_0$ 106. Note $W_0$ 106 is the original source for first time varying data d.

In beacon 862', transmitted from $W_1$ 108, information triplet 825'={1:3:0}, indicating that $W_1$ 108 is 1 hop away from the original source of the first time varying data; the second identifier $h_d$ 124 is to be propagated for 3 beacon hops from the original source, and the nearest source of first time varying data is 0 hops away from $W_1$ 108. Note $W_1$ 108 I includes a cached copy of first time varying data d.

In beacon 862", transmitted from $W_2$ 110, information triplet 825"={2:3:1}, indicating that $W_2$ 110 is 2 hops away from the original source of the first time varying data; the second identifier $h_d$ 124 is to be propagated for 3 beacon hops from the original source, and the nearest source of first time varying data is 1 hops away from $W_2$ 110.

Figure 9:
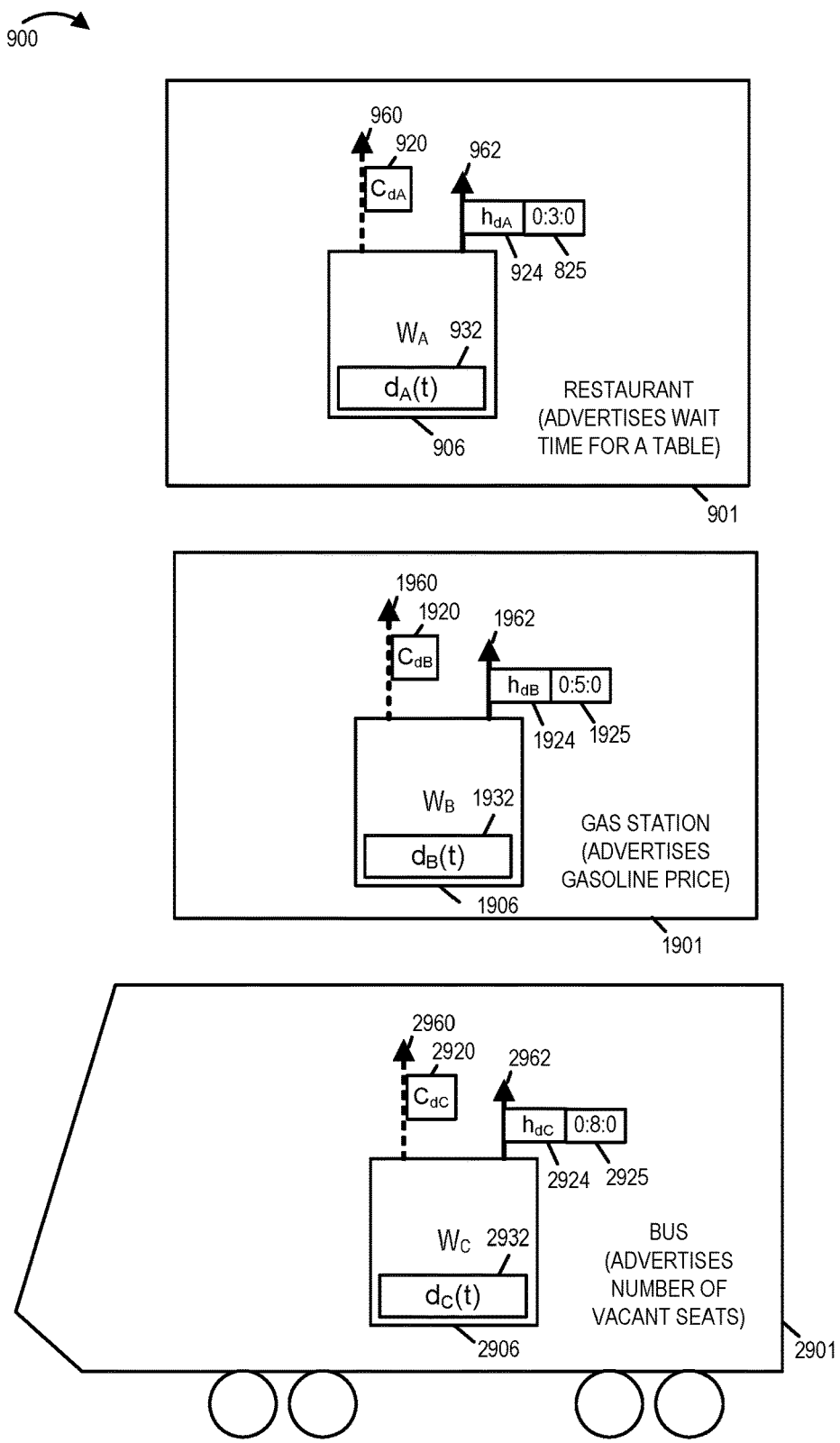
FIG. 9 is a drawing illustrating three exemplary wireless devices which may be sources of time varying data in accordance with an exemplary embodiment.
Figure 10B:
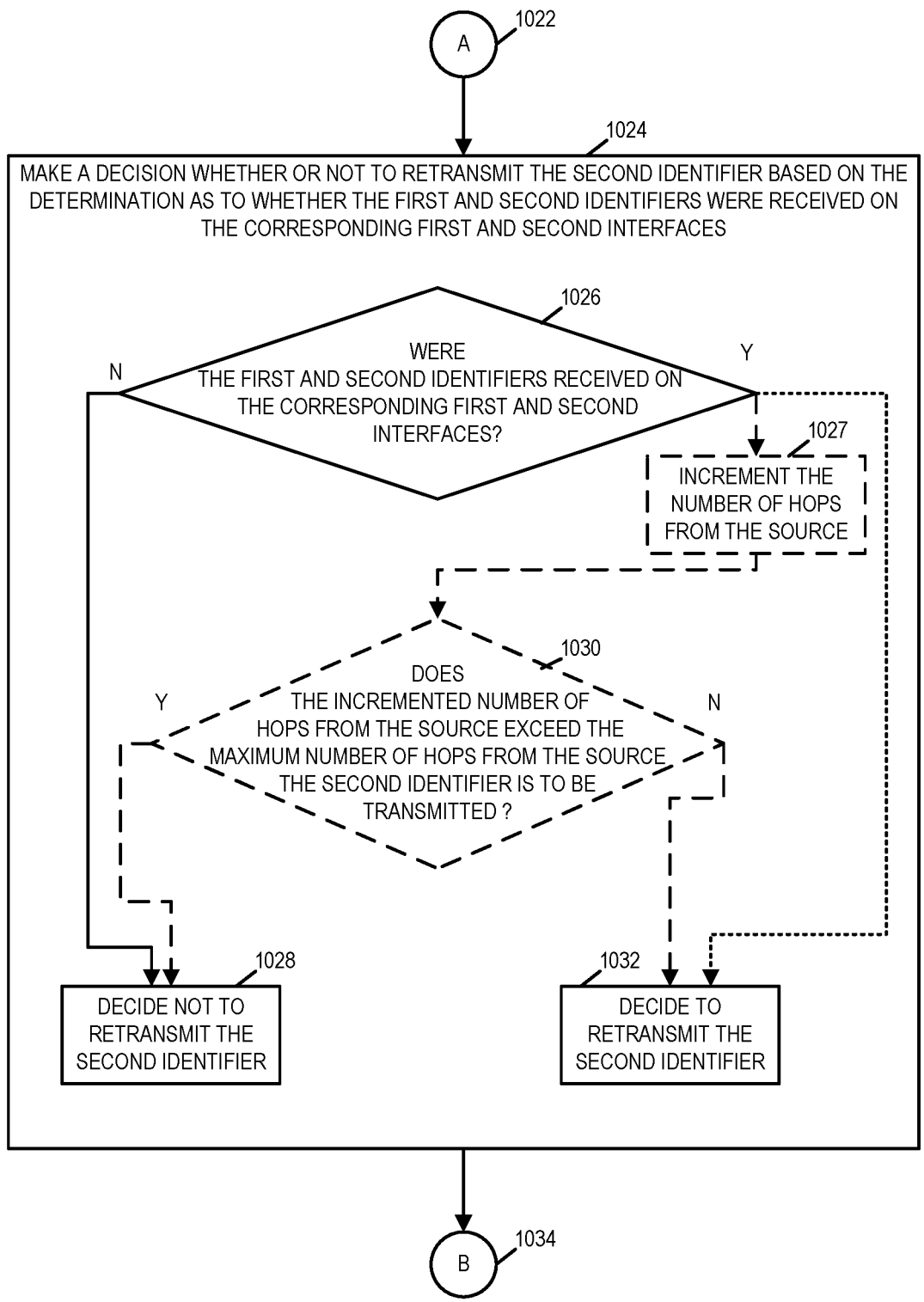
FIG. 10B is a second part of a flowchart of an exemplary method of operating a communications device, e.g. a wireless device, to communicate information in accordance with an exemplary embodiment.
Figure 10C:
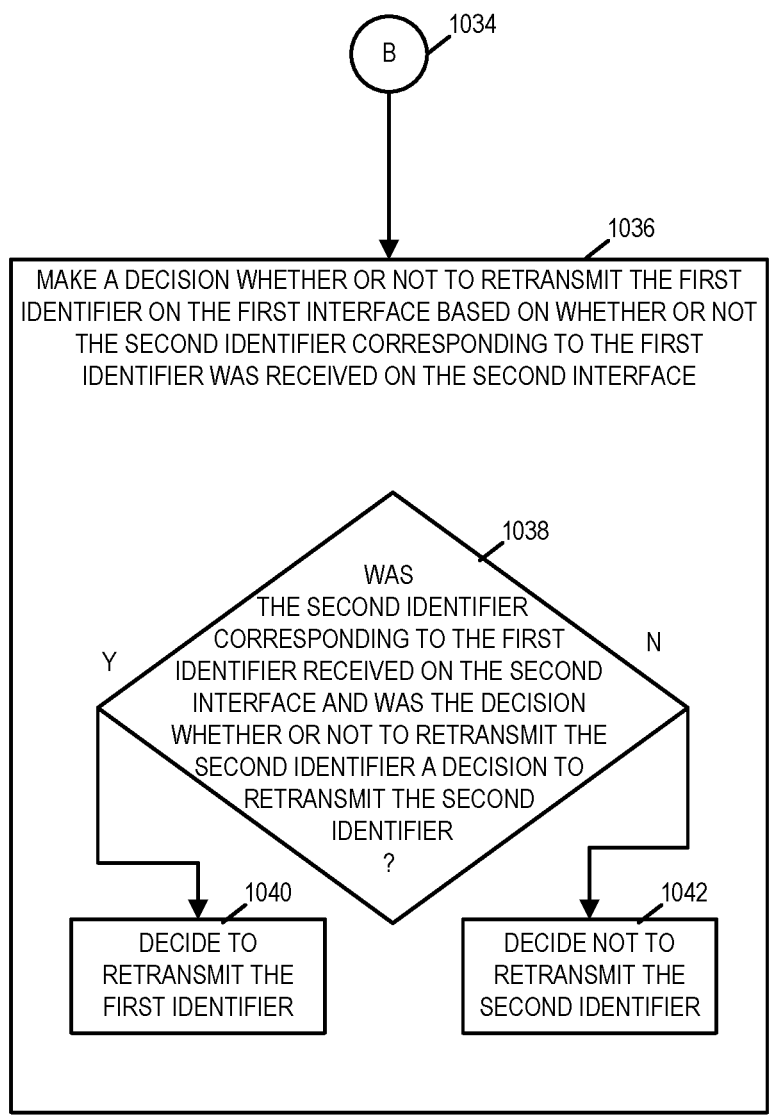
FIG. 10C is a third part of a flowchart of an exemplary method of operating a communications device, e.g. a wireless device, to communicate information in accordance with an exemplary embodiment.
Figure 10D:
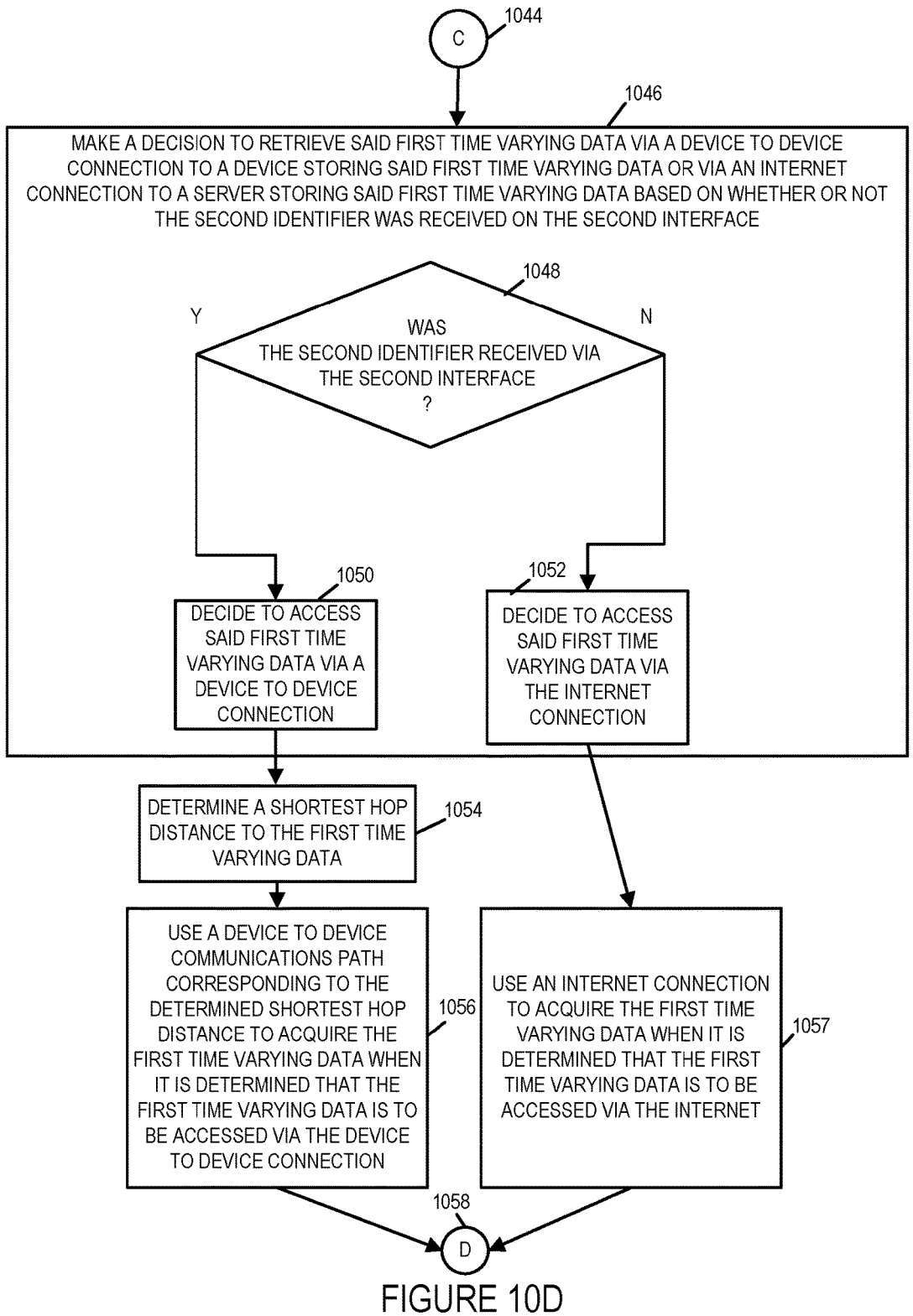
FIG. 10D is a fourth part of flowchart of an exemplary method of operating a communications device, e.g. a wireless device, to communicate information in accordance with an exemplary embodiment.
Figure 10E:
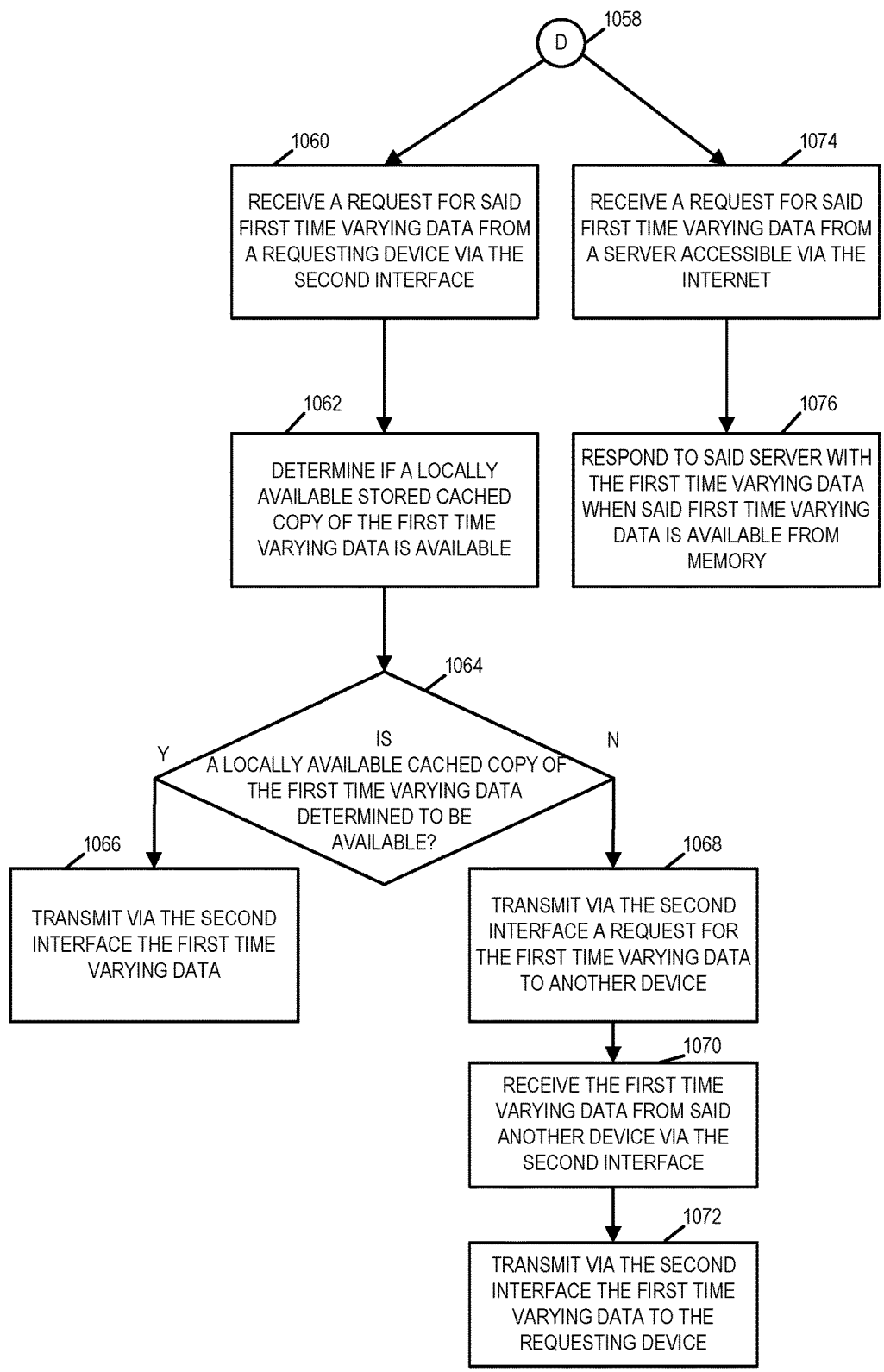
FIG. 10E is a fifth part of flowchart of an exemplary method of operating a communications device, e.g. a wireless device, to communicate information in accordance with an exemplary embodiment.

FIG. 9 is a drawing 900 illustrating three exemplary wireless devices which may be sources of time varying data in accordance with an exemplary embodiment. Wireless device $W_A$ 906 included within a restaurant A 901 advertises wait time for a table. $W_A$ 932 includes $d_A(t)$ 932 which is time varying data which represents the wait time for a table. Wireless device $W_B$ 1906 included at gas station B site 1901 advertises gasoline price. $W_B$ 1932 includes $d_B(t)$ 1932 which is time varying data which represents the price for regular gasoline at gas station B. Wireless device $W_C$ 2906 located within a bus 2901 advertises the number of vacant seats on the bus C. $W_C$ 2932 includes $d_C(t)$ 2932 which is time varying data which represents the number of vacant seats on bus C.

$W_A$ 906 transmits LTED beacon 960 communicating first identifier $C_{dA}$, which is an OTACode which maps to information indicating that restaurant A data indicating wait time for a table is available. $W_A$ 906 transmits WIFI beacon 962 communicating second identifier $h_{dA}$, which can be used in a request signal to request the value of the wait time for a table at restaurant A.

$W_B$ 1906 transmits LTED beacon 1960 communicating first identifier $C_{dB}$, which is an OTACode which maps to information indicating that gas station B data indicating price for regular gasoline is available. $W_B$ 1906 transmits WIFI beacon 1962 communicating second identifier $h_{dB}$, which can be used in a request signal to request the value of regular gasoline at gas station B.

$W_C$ 2906 transmits LTED beacon 2960 communicating first identifier $C_{dC}$, which is an OTACode which maps to information indicating that bus C data indicating the number of vacant seats on bus C is available. $W_C$ 2906 transmits WIFI beacon 2962 communicating second identifier $h_{dC}$, which can be used in a request signal to request the number of vacant seats on bus C.

Beacon 962 includes information triplet field 925={0:3:0}, in which the second value of the triplet indicates that $h_{dA}$ is to be propagated 3 beacon hops from source device 906. Beacon 1962 includes information triplet field 1925={0:5:0}, in which the second value of the triplet indicates that $h_{dB}$ is to be propagated 5 beacon hops from source device 1906. Beacon 2962 includes information triplet field 2925={0:8:0} indicating that $h_{dC}$ is to be propagated 8 beacon hops from source device 2906.

The exemplary source devices 906, 1906, and 2906 may be part of a large communications system, e.g., the communications system of FIG. 1, in which there are many more wireless devices, e.g., hundreds or thousands or tens of thousands of wireless devices, etc., which can transmits and receive beacon signals. Source devices for time varying data, which transmit beacons and source requested time varying data may also receive beacons, retransmit received beacons and request time varying data from other devices in the system. Some wireless devices in the system may receive beacons, and retransmit beacons, and request and receive time varying data, but may not necessarily be an original source of time varying data.

Various aspects and/or features of some embodiments, are further discussed below.

An exemplary Transmission Path Database ($TPDB_{local}$) will now be described. Each wireless device maintains a local Transmission Path Database (TPDB). A device's local TPDB is a graph-based data structure that captures its firsthand perception of network events on its network interfaces.

A vertex represents a wireless device. A vertex is labeled with unique device identifier (e.g., MAC address, Android ID, Apple UDID, serial number).

An edge represents 1-hop reachability between two devices on a particular network interface. An edge is labeled with the corresponding network interface (e.g., LTED, WiFi, BT, BLE), one or more time intervals (i.e., (start time, end time)), and any network reception events that occurred in those intervals.

A network reception event includes: a unique reception event identifier (i.e., unique in the local TPDB); time of event; sender device identifier; what was received (e.g., d, $e_d$, $C_d$, $h_d$: {hop-triplet}), and any network or extra sensor metadata (e.g., RSSI, geolocation, etc.)

An exemplary LTED Cache & $TPDB_{local}$ Index will now be described. Given a $c_d$ (LTED OTACode) this data structure will return: (i) the $e_d$ that $c_d$ resolves to (The ENS is to be contacted if $e_d$ cannot be locally resolved.) and (ii) each of the reception event identifiers (and associated edges and nodes) in the local TPDB in which $c_d$ was received.

An exemplary Data Access Cache & $TPDB_{local}$ Index will now be described. Given a $h_d$ (DAS hash code), this data structure will return: (i) the associated $c_d$, if any; (ii) a list of (t, d(t)) pairs indicating the value of d at time t if d has been accessed (if any); (iii) the public fields of $a_d$ (if $a_d$ has been obtained); and (iv) each of the reception event identifiers (and associated edges and nodes) in the local TPDB in which $h_d$ was received.

An exemplary Transmission Path Database ($TPDB_{global}$) will now be described. The Data Access Server (DAS) maintains a global Transmission Path Database (TPDB). The global TPDB is a graph-based data structure that approximates the system-wide view of network events on participating devices' network interfaces. This structure is identical to TPDBlocal, but aggregates input from all participating system wireless devices.

An exemplary Data Access Database will now be described. A database includes the following attributes (i) $h_d$: DAS-assigned hash code; (ii) $a_d$: data access metadata; (iii) $c_d$: LTED OTACode; (iv) $w_i$: wireless device provider's unique device identifier; (v) and $w_i$'s listening IP address(es) and port(s) (if applicable).

A exemplary Data Access Cache will now be described. A global cache including time stamped data values d(t) that can be retrieved by associated $h_d$ hash.

FIG. 10, comprising the combination of FIG. 10A, FIG. 10B, FIG. 10C, FIG. 10D, and FIG. 10E, is a flowchart 1000 of an exemplary method of operating a communications device, e.g., a second wireless device, e.g., $W_1$, to communicate information in accordance with an exemplary embodiment. In some embodiments the exemplary method of flowchart 1000 may be performed a second wireless device, e.g., $W_1$ 108 of FIG. 1 and FIG. 2 or $W_1$ 408 of FIGS.

4 and 5. Operation starts in step 1002 in which the communications device is powered on and initialized. Operation proceeds from step 1002 to steps 1004 and 1006, which may be performed in parallel. In step 1004 the communications devices monitors to detect receipt of a first identifier, e.g., $C_d$, via a first network interface, e.g., an LTED interface, corresponding to a first network, said first identifier, e.g., $C_d$, corresponding to first information, e.g., $e_d$, that is available via the first network, said first information indicating a source of first time varying data, e.g., d, and a description of the first time varying data. In some embodiments, the description describes what the first time varying data represents or indicates. In some embodiments the source, e.g., the original source, of the first time varying data, e.g., d, is a first wireless device, e.g., Wo 106 or $W_O$ 406. Step 1004, may, and sometimes does, include step 1008, in which the communications device receives the first identifier, e.g., $C_d$, on the first interface. In some embodiments, the first identifier, e.g., Cd, is an LTED OTA code. Operation proceeds from step 1004 to 1014. In step 1014, the communications device determines if the first identifier was received on the first interface. Operation proceeds from step 1014 to connecting node A 1022.

Returning to step 1006, in step 1006 the communications device monitors to detect receipt of a second identifier, e.g., $h_d$, via a second network interface, e.g., a WiFi interface, corresponding to a second network, said second identifier, e.g., $h_d$, corresponding to the first time varying data, e.g., d, available via the second network. In some embodiments, the first identifier is any one of a plurality of identifiers corresponding to the second identifier. Step 1006 may, and sometimes does, include one or both of step 1010 and step 1012. In step 1010 the communications device receives the second identifier, e.g., $h_d$, on the second interface. In some embodiments, the second identifier, e.g., $h_d$, is a hash value. In step 1012 the communications device receives with the second identifier, e.g. with $h_d$: i) first distance information indicating distance, e.g., in terms of number of hops, from a provider of said first time varying data, e.g., d, said first distance information is one of a number of hops to the source, e.g., $W_O$, of said first time varying data, e.g., d, or a number of hops to a device including a valid copy of said first time varying data, e.g., a device which cached said first time varying data; ii) maximum propagation information indicating a number of hops said second identifier is to be propagated from the source, e.g., $W_O$, of said first time varying data, e.g., d; and iii) information indicating at least two methods for accessing said first time varying data, e.g., d, a first method being an Internet access method and a second method being a device to device method. In some embodiments, the number of hops to the source, e.g., $W_O$, of said time varying data is a first value in a triplet sent with $h_d$. In some embodiments, the number of hops to a device including a valid copy of said first time varying data is a last value in a triplet sent with $h_d$. In some embodiments, the device implementing the method of flowchart 1000, e.g., second device W1 may be, and sometimes is, a device including a valid copy of said first time varying data; for example, $W_1$ may have a stored cached copy of the first time varying data. In some embodiments, the maximum propagation information is included as a second value in a triplet sent with $h_d$. Operation proceeds from step 1006 to step 1016. In step 1016 the communications device determines if the second identifier corresponding to the first identifier was received on the second interface. In some embodiments, operation proceeds from step 1016 to step 1018. In some embodiments, operation proceeds from step 1016 to connecting node A 1022 and bypasses optional steps 1018 and 1020. Operation also proceeds from step 1016, via connecting node C 1044 to step 1046.

Returning to step 1018, in step 1018, the communications device determines a hop distance to a source of said first time varying data. Operation proceeds from step 1018 to step 1020. In step 1020 the communications device determines a maximum number of hops from the source that the second identifier is to be transmitted. Operation proceeds from step 1020 to connecting node A 1022. Operation proceeds from connecting node A 1022 to step 1024.

In step 1024, the communications device makes a decision whether or not to retransmit the second identifier based on the determination as to whether the first and second identifier were received on the corresponding first and second interface. Step 1024 includes step 1026, 1028 and 1032. In some embodiments, step 1024 includes optional steps 1027 and 1030. In step 1026 the communications device determines if the first and second identifiers were received on the corresponding first and second interfaces. If the determination is that the first and second identifiers were received on the corresponding first and second interfaces, then operation proceeds to step 1027 or step 1032, depending on the particular exemplary embodiment; otherwise, operation proceeds from step 1026 to step 1028. In step 1028 the communications device decides not to retransmit the second identifier.

Returning to step 1027, in step 1027 the communications device increments the number of hops from the source of the first time varying data. Operation proceeds from step 1027 to step 1030. In step 1030 the communications devices determines if the incremented number of hops from the source exceeds the maximum number of hops from the source that the second identifier is to be transmitted. If the determination is that the incremented number of hops from the source exceeds the maximum number of hops from the source that the second identifier is to be transmitted, then operation proceeds from step 1030 to step 1028, in which the communications device decides not to retransmit the second identifier; otherwise, operation proceeds from step 1030 to step 1032, in which the communications device decides to retransmit the second identifier. In some embodiments, step 1030 is omitted, and if the first and second identifier were determined to have been received on the corresponding first and second interfaces in step 1026, then operation proceeds to step 1032, in which the communications device decides to retransmit the second identifier. Operation proceeds from step 1024, via connecting node B 1034 to step 1036.

In step 1036 the communications device makes a decision whether or not to retransmit the first identifier on the first interface based on whether or not the second identifier corresponding to the first identifier was received on the second interface. Step 1036 includes steps 1038, 1040 and 1042. In step 1038 the communications device determines if the second identifier corresponding to the first identifier was received on the second interface and if the decision whether or not to transmit the second identifier was a decision to retransmit the second identifier, and the communications device controls operation as a function of the determination. If the second identifier corresponding to the first identifier was received on the second interface and the decision whether or not to retransmit the second identifier was a decision to retransmit the second identifier, then operation proceeds from step 1038 to step 1040 in which the communications device decides to retransmit the first identifier;

otherwise, operation proceeds from step 1038 to step 1042 in which the communications device decides not to transmit the second identifier.

Returning to step 1046, in step 1046, the communications device makes a decision to retrieve said first time varying data via a device to device connection or via an Internet connection to a server storing said time varying data based on whether or not the second identifier was received on the second interface. Step 1046 includes step 1048, 1050 and 1052. In step 1048, if the second identifier was received via the second interface, then operation proceeds from step 1048 to step 1050 in which the communications devices decides to access said first time varying data via a device to device connection; however, if the second identifier was not received via the second interface, then operation proceeds from step 1048 to step 1052 in which the communications device decides to access said first time varying data via the Internet connection. Operation proceeds from step 1052 to step 1057, in which the communications device uses an Internet connection to acquire, e.g., access and retrieve, the first time varying data when it is determined that the first time varying data is to be accessed via an Internet connection. In some embodiments, in step 1057 the communications device also stores the retrieved first time varying data in a local cache. Operation proceeds from step 1057, via connecting node D 1058 to step 1060 and to step 1074.

Operation proceeds from step 1050 to step 1054 in which the communications device determines a shortest hop distance to the first time varying data, e.g., the shortest hop distance to either a source or cached version of the first time varying data. Operation proceeds from step 1054 to step 1056 in which the communications devices uses a device to device communications path corresponding to the determined shortest hop distance to acquire, e.g., access and retrieve, the first time varying data when it is determined that the first time varying data is to be accessed via the device to device connection. In some embodiments, in step 1056 the communications device also stores the retrieved first time varying data in a local cache. Operation proceeds from step 1056, via connecting node D 1058 to step 1060 and to step 1074.

In step 1060 the communications device receives a request for said first time varying data from a requesting device via the second interface. In one exemplary embodiment the requesting device is a third wireless device, e.g., $W_2$ 110 of FIGS. 1-2 or $W_2$ 410 of FIGS. 4-5. Operation proceeds from step 1060 to step 1062. In step 1062 the communications device determines if a locally available stored cached copy of the first time varying data is available. Operation proceeds from step 1062 to step 1064. In step 1064, if a locally available cached copy of the first time varying data is determined to be available, then operation proceeds from step 1064 to step 1066; otherwise, operation proceeds from step 1064 to step 1068. In step 1066 the communications device transmits via the second interface the first time varying data.

Returning to step 1068, in step 1068 the communications device transmits via the second interface a request for the first time varying data to another device. Operation proceeds from step 1068 to step 1070. In step 1070 the communications device receives the first time varying data from said another device via the second interface. Operation proceeds from step 1070 to step 1072, in which the communications device transmits via the second interface the first time varying data to the requesting device.

Returning to step 1074, in step 1074 the communications device receives a request for said first time varying data from a server accessible via the Internet. Operation proceeds from step 1074 to step 1076 in which the communications device responds to said server with the first time varying data when the first time varying data is available from memory.

Figure 11A:
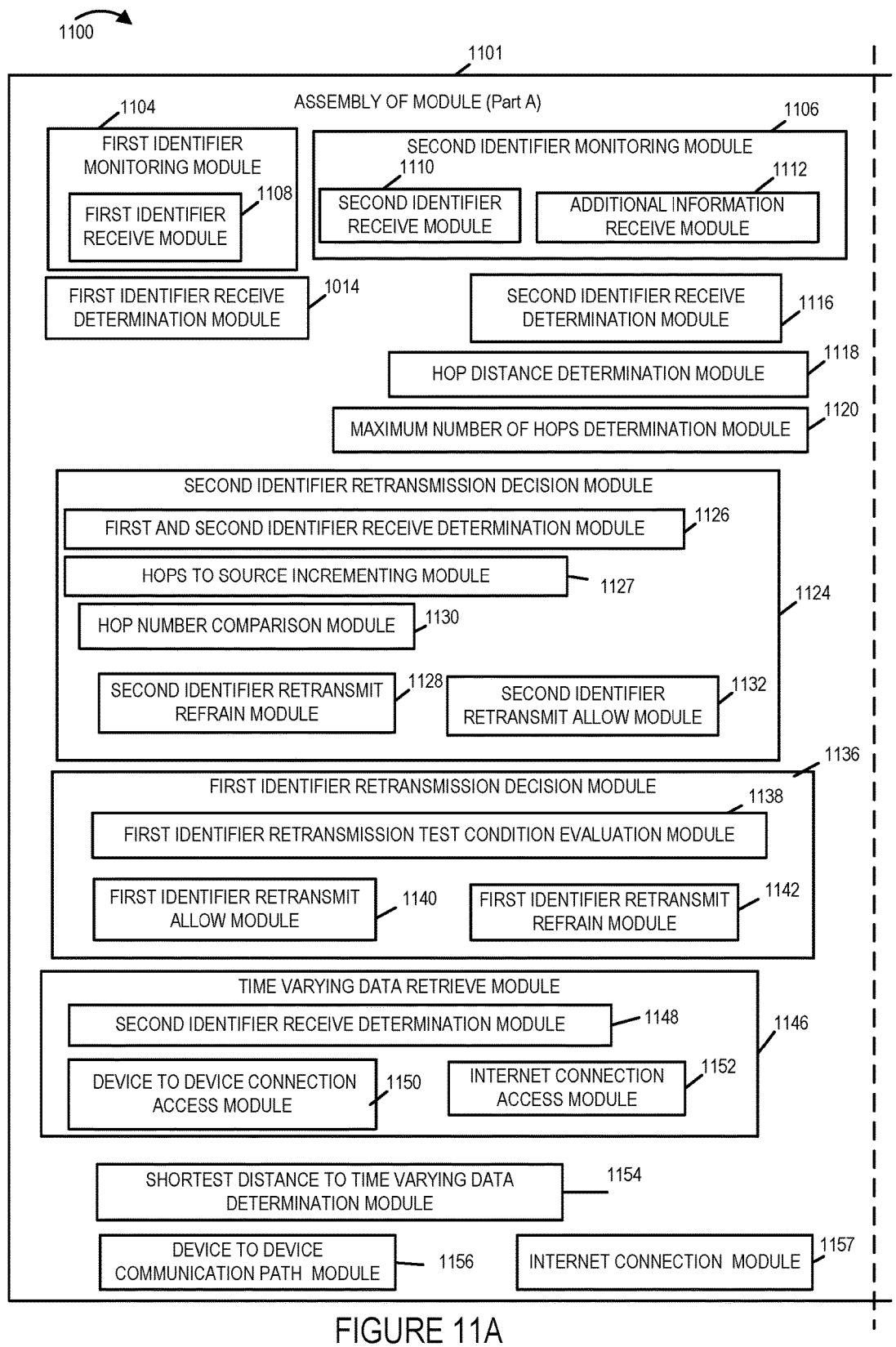
FIG. 11A illustrates a first part of an exemplary assembly of modules which may be included in an exemplary wireless device in accordance with an exemplary embodiment.
Figures 11, 11B:
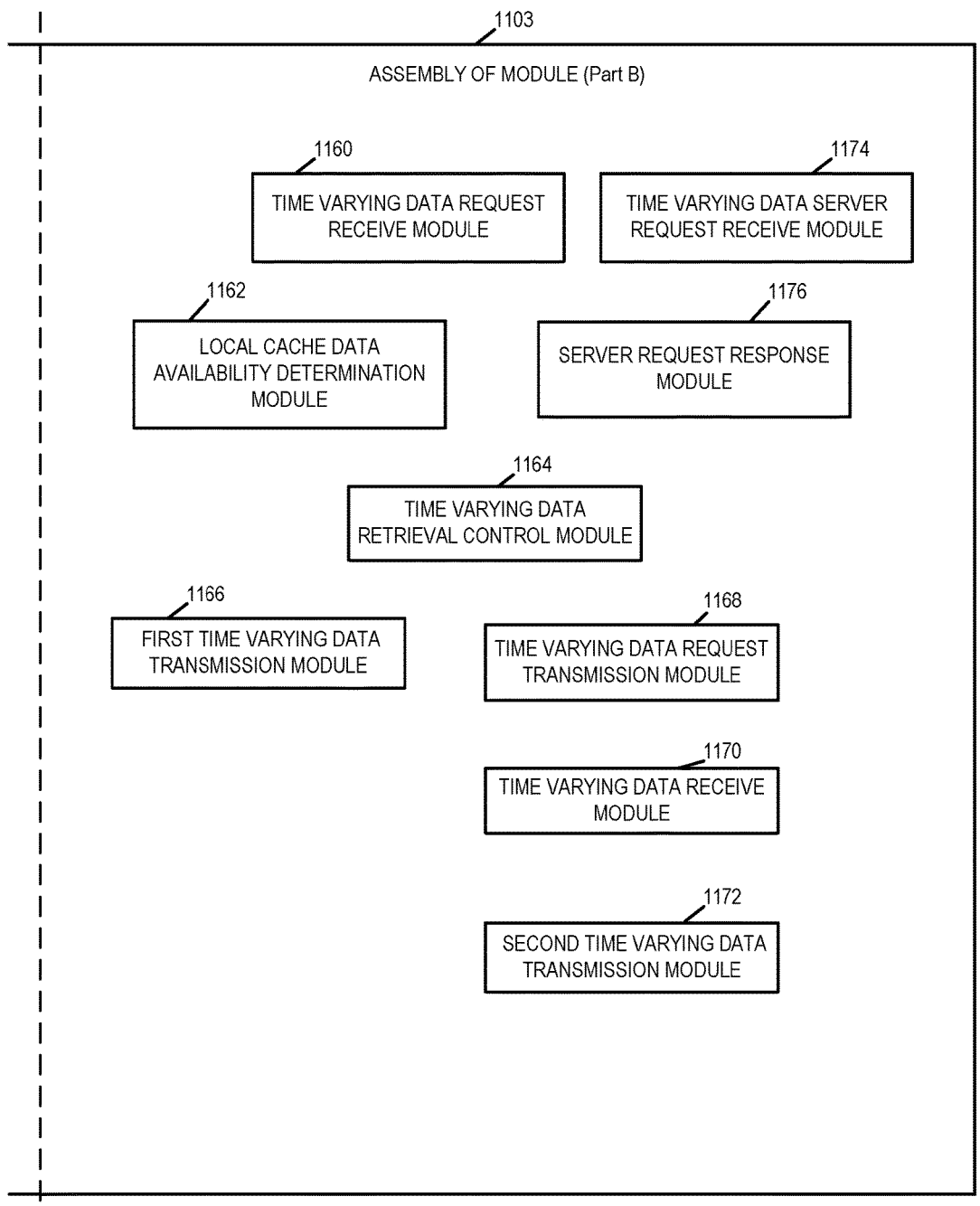
FIG. 11B illustrates a second part of an exemplary assembly of modules which may be included in an exemplary wireless device in accordance with an exemplary embodiment.
FIG. 11 comprises the combination of FIG. 11A and FIG. 11B.

FIG. 11, comprising the combination of FIG. 11A and FIG. 11B, is a drawing of an assembly of modules 1100, comprising the combination of part A 1101 and part B 1103, which may be included in an exemplary wireless device, e.g., wireless device 600 of FIG. 6, in accordance with an exemplary embodiment. Assembly of modules 1100 which can, and in some embodiments is, used in the wireless device 600. In some embodiments, second wireless device $W_1$ 108 of FIGS. 1-2 or $W_1$ 408 of FIGS. 4-5 is implemented in accordance with wireless device 600 and includes assembly of modules 1100. The modules in the assembly of modules 1100 can, and in some embodiments are, implemented fully in hardware within the processor 646, e.g., as individual circuits. The modules in the assembly of modules 1100 can, and in some embodiments are, implemented fully in hardware within the assembly of modules 650, e.g., as individual circuits corresponding to the different modules. In other embodiments some of the modules are implemented, e.g., as circuits, within the processor 646 with other modules being implemented, e.g., as circuits within assembly of modules 650, external to and coupled to the processor 646. As should be appreciated the level of integration of modules in the processor and/or with some modules being external to the processor may be one of design choice. Alternatively, rather than being implemented as circuits, all or some of the modules may be implemented in software and stored in the memory 648 of the wireless device 600, with the modules controlling operation of wireless device 600 to implement the functions corresponding to the modules when the modules are executed by a processor, e.g., processor 646. In some such embodiments, the assembly of modules 1100 is included in the memory 648 as assembly of modules 654. In still other embodiments, various modules in assembly of modules 1100 are implemented as a combination of hardware and software, e.g., with another circuit external to the processor providing input to the processor 646 which then under software control operates to perform a portion of a module's function. While shown in the FIG. 6 embodiment as a single processor, e.g., computer, it should be appreciated that the processor 646 may be implemented as one or more processors, e.g., computers.

When implemented in software the modules include code, which when executed by the processor 646, configure the processor 646 to implement the function corresponding to the module. In embodiments where the assembly of modules 1100 is stored in the memory 648, the memory 648 is a computer program product comprising a computer readable medium comprising code, e.g., individual code for each module, for causing at least one computer, e.g., processor 646, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 11 control and/or configure the wireless device 600 or elements therein such as the processor 646, to perform the functions of corresponding steps illustrated in the method of one or more of the signaling drawing of FIG. 2, 4, 5, 8, 9 and/or flowchart 1000 of FIG. 10 and/or described with respect to any of the Figures. Thus the assembly of modules 1100 includes various modules that perform functions of corresponding steps of one or more of FIG. 10 and/or FIGS. 1-5, 8, and/or 9.

Assembly of modules 1100 includes a first identifier monitoring module 1104 configured to monitor to detect receipt of a first identifier via a first network interface corresponding to a first network, said first identifier corresponding to first information that is available via the first network, said first information indicating a source of said first time varying data and a description of the first time varying data. First monitoring module 1104 includes a first identifier receive module 1108 configured to control a receiver to receive the first identifier on the first interface. Assembly of modules 1100 further includes a second identifier monitoring module 1106 configured to monitor to detect receipt of a second identifier via a second network interface corresponding to a second network, said second identifier corresponding to the first time varying data available via the second network. Second identifier monitoring module 1106 includes a second identifier receive module configured to control a receiver to receive the second identifier on the second interface and an additional information receive module 1112 configured to the control the receiver to receive on the second information with the second identifier: i) first distance information indicating distance from a provider of said first time varying data, said first distance information is one of a number of hops to the source of said first time varying data or a number of hops to a device including a valid copy of said first time varying data; ii) maximum propagation information indicating a number of hops said second identifier is to be propagated from the source of said first time varying data; and iii) information indicating at least two methods for accessing said first time varying data, a first method being an Internet access method and a second method being a device to device method.

Assembly of modules 1100 further includes a first identifier determination module 1114 configured to determine if the first identifier was received on the first interface, and a second identifier receive determination module 1116 configured to determine if the second identifier corresponding to the first identifier was received on the second interface. Assembly of modules 1100 further includes a hop distance determination module 1118 configured to determine a hop distance to a source of said first time varying data, and a maximum number of hops determination module 1120 configured to determine a maximum number of hops from the source that the second identifier is to be transmitted.

Assembly of module 1100 further includes a second identifier retransmission decision module 1124 configured to make a decision whether or not to retransmit the second identifier based on the determination as to whether the first and second identifiers were received on the corresponding first and second interfaces. Second identifier retransmission decision module 1124 includes a first and second identifier receive determination module 1126, a hops to source incrementing module 1127, a hop number comparison module 1130, a second identifier retransmit refrain module 1128 and a second identifier retransmit allow module 1132. First and second identifier receive determination module 1126 is configured to determine if the first and second identifiers were received on the corresponding first and second interfaces, and to control operation as a function of the determination. Hops to source incrementing module 1127 is configured to increment the number of hops from the source of the time varying data. Hop number comparison module 1130 is configured to determine if the incremented number of hops from the source exceeds the maximum number of hops form the source that the second identifier is to be transmitted and to control operation as a function of the determination. Second identifier retransmit refrain module 1128 is configured to control the communications device to refrain from retransmitting the second identifier. Second identifier retransmit allow module 1132 is configured to control the communications device to retransmit the second identifier. In one embodiment, module 1128 is activated based on the determination that by module 1126 that at least one of the first and second identifiers was not received on the corresponding first and second interfaces. In one embodiment, module 1128 is activated based on the determination by module 1130 that the incremented number of hops from the source of the time varying data exceeds the maximum number of hops from the source that the second identifier is to be transmitted. In one embodiment, module 1132 is activated based on the determination that by module 1126 that the first and second identifiers were received on the corresponding first and second interfaces. In one embodiment, module 1132 is activated based on the determination by module 1130 that the incremented number of hops from the source of the time varying data does not exceed the maximum number of hops from the source that the second identifier is to be transmitted.

Assembly of modules 1100 further includes a first identifier retransmission decision module 1136 configured to make a decision whether or not to retransmit the first identifier on the first interface based on whether or not the second identifier corresponding to the first identifier was received on the first interface. First identifier retransmission decision module 1136 includes a first identifier retransmission test condition evaluation module 1138, a first identifier retransmit allow module 1140 and a first identifier retransmit refrain module 1142. First identifier retransmission test condition evaluation module 1138 is configured to determine if the second identifier corresponding to the first identifier was received on the second interface and to determine if the decision whether or not to retransmit the second identifier was a decision to retransmit the second identifier and to control operation as a function of the determination. If both test conditions are satisfied, the second identifier was received on the second interface and the decision was to retransmit the second identifier, then module 1138 decides to retransmit the first identifier on the first interface and module 1138 activates first identifier retransmit allow module 1140. However, if both of the test conditions are not satisfied, then module 1138 decides not to retransmit the first identifier on the first interface and module 1138 activates first identifier retransmit refrain module 1142. First identifier retransmit allow module 1140 is configured to control the communications device to retransmit the first identifier on the first interface. First identifier retransmit refrain module 1142 is configured to control the communications device to refrain from retransmitting the first identifier on the first interface.

Assembly of module 1100 further includes a time varying data retrieve module 1146 configured to make a decision to retrieve said first time varying data via a device to device connection to a device storing said first time varying data via a device to device connection to a device storing said first time varying data or via an Internet connection to a server storing said first time varying data based on whether or not the second identifier was received on the second interface. Time varying data retrieve module 1146 includes a second identifier receive determination module 1148, a device to device connection access module 1150, and an Internet connection access module 1152. Second identifier receive determination module 1148 is configured to determine if the second identifier was received via the second interface and to control operation as a function of the decision. Module 1148 decides to access said first time varying data via a device to device connection in response to a determination that the second identifier was received via the second interface, and module 1148 activates the device to device connection access module in response to the determination that the second identifier was received via the second interface. Module 1148 decides to access said first time varying data via an Internet connection in response to a determination that the second identifier was not received via the second interface, and module 1148 activates the Internet connection access module 1152 in response to the determination that the second identifier was not received via the second interface. Device to device connection access module 1150 accesses, e.g., retrieves, said first time varying data via a device to device connection. In some embodiments, device to device connection access module 1150 also stores the accessed first time varying data, e.g., in a local cache, e.g., for its own use and/or to be available to communicate to another device. Internet connection access module 1152 accesses, e.g., retrieves, said first time varying data via an Internet connection. In some embodiments, Internet connection access module 1152 also stores the accessed first time varying data, e.g., in a local cache, e.g., for its own use and/or to be available to communicate to another device. Assembly of modules 1100 further includes a shortest distance to time varying data determination module 1154 configured to determine a shortest hop distance to the first time varying data and a device to device communication path module 1156 configured to use a device to device communications path corresponding to the determined shortest hop distance to acquire, e.g., access and retrieve, the first time varying data when it is determined that the first time varying data is to be accessed via the device to device connection. In some embodiments, module 1156 also stores the retrieved first time varying data in a local cache. Assembly of module 1100 further includes an Internet connection module 1157 configured to configured to use an Internet connection to acquire, e.g., access and retrieve, the first time varying data when it is determined that the first time varying data is to be accessed via an Internet connection. In some embodiments, module 1157 also stores the retrieved first time varying data in a local cache.

Assembly of modules 1100 further includes a time varying data request receive module 1160 configured to receive a request for said first time varying data from a requesting device via the second interface, a local cache data availability determination module 1162 configured to determine if a locally available stored cached copy of the first time varying data is available, a time varying data retrieval control module 1164 configured to control operation as a function of the determination as to whether or not a locally available cached copy of the first time varying data is available, a time varying data transmission module 1166 and a time varying data request transmission module 1168. If a locally available cached copy of the first time varying data is determined to be available, module 1164 controls operation to activate module 1166. If a locally available cached copy of the first time varying data is determined not to be available, module 1164 controls operation to activate module 1168. First time varying data transmission module 1166 is configured to control the communications device to transmit via the second interface the first time varying data, e.g., the first time varying data in its local cache. Time varying data request transmission module 1168 is configured to transmit via the second interface a request for the first time varying data to another device. Assembly of modules 1100 further includes a time varying data receive module 1170 configured to receive the first time varying data from said another device via the second interface, and a second time varying data transmission module 1172 configured to control the communications device to transmit via the second interface the first time varying data to the requesting device. In some embodiment, module 1166 and module 1172 are the same module. Assembly of modules 1100 further includes a time varying data server request receive module 1174 configured to receive a request for said first time varying data from a server accessible via the Internet and a server request response module 1176 configured to respond to said server with the first time varying data when said first time varying data is available from memory.

Various exemplary embodiments of exemplary communications devices are described below. An exemplary communications device (600) of exemplary embodiment 1 comprises: a first network interface (606) corresponding to a first network; a second network interface (608) corresponding to a second network; and a processor (646) configured to: monitor to detect receipt of a first identifier via the first network interface corresponding to the first network, said first identifier corresponding to first information that is available via the first network, said first information indicating a source of first time varying data and a description of the first time varying data; monitor to detect receipt, via the second network interface, of a second identifier corresponding to the time varying data available via the second network; determine if the first identifier was received on the first interface; determine if the second identifier corresponding to the first identifier was received on the second interface; and make a decision whether or not to retransmit the second identifier based on said determination as to whether the first and second identifiers were received on the corresponding first and second interfaces.

An exemplary communications device (600) of exemplary embodiment 2 includes the features of exemplary embodiment 1, and said processor (646) is further configured to decide not to retransmit the second identifier when the first and second identifiers were not received on the corresponding first and second interfaces, as part of being configured to make a decision whether or not to retransmit the second identifier.

An exemplary communications device (600) of exemplary embodiment 3 includes the features of exemplary embodiment 1, and said processor (646) is further configured to: receive with said second identifier i) first distance information indicating distance from a provider of said first time varying data, said first distance information is one of a number of hops to the source of said time varying data or a number of hops to a device included a valid copy of said time varying information; ii) maximum propagation information indicating a number of hops said second identifier is to be propagated from the source of said first time varying data and iii) information indicating at least two methods for accessing said first time varying data, a first method being an Internet access method and a second method being a device to device method.

An exemplary communications device (600) of exemplary embodiment 4 includes the features of exemplary embodiment 1, and said processor (646) is further configured to: determine a hop distance to a source of said first time varying data; determine a maximum number of hops from the source the second identifier is to be transmitted;

incrementing the number of hops from the source; make a decision not retransmit the second identifier when the incremented number of hops from the source exceeds the maximum number of hops from the source the second identifier is to be transmitted; and make a decision to retransmit the second identifier when i) the incremented number of hops from the source is equal to or less than the maximum number of hops from the source the second identifier is to be transmitted; ii) the first identifier was received on the first network interface, and iii) the second identifier corresponding to the first identifier has been received on the second network interface.

An exemplary communications device (600) of exemplary embodiment 5 includes the features of exemplary embodiment 4, and said processor (646) is further configured to: make a decision whether or not to retransmit the first identifier on the first interface based on whether or not the second identifier corresponding to the first identifier was received on the second interface.

An exemplary communications device (600) of exemplary embodiment 6 includes the features of exemplary embodiment 5, and said processor (646) is further configured to: decide to retransmit the first identifier on the first interface when the second identifier corresponding to the first identifier has been received on the second interface and the decision of whether or not to retransmit the second identifier was a decision to retransmit the second identifier, as part of being configured to make a decision whether or not to retransmit the first identifier on the first interface based on whether or not the second identifier corresponding to the first identifier was received on the second interface includes:

An exemplary communications device (600) of exemplary embodiment 7 includes the features of exemplary embodiment 1, and said processor (646) is further configured to: determine whether or not the second identifier was received on the second interface; and make a decision to retrieve said first time varying data via a device to device connection to a device storing said first time varying data or via an Internet connection to a server storing said first time varying data based on whether or not the second identifier was received on the second interface.

An exemplary communications device (600) of exemplary embodiment 8 includes the features of exemplary embodiment 7, and said processor (646) is further configured to: decide to access said first time varying data via a device to device connection when said second identifier was received via the second interface and decide to access said first time varying data via the Internet connection when the second identifier was not received on the second interface, as part of being configured to make a decision to retrieve said first time varying data via a device to device connection to a device storing said first time varying data or via an Internet connection.

An exemplary communications device (600) of exemplary embodiment 9 includes the feature of exemplary embodiment 8, and said processor (646) is further configured to: determine a shortest hop distance to the first time varying data; and use a device to device communications path corresponding to the determined shortest hop distance when it is decided that the first time varying data is to be accessed via the device to device connection.

An exemplary communications device (600) of exemplary embodiment 10 includes the features of exemplary embodiment 9, and said processor (646) is further configured to: receive a request for said first time varying data from a requesting device via a receiver in the second interface; determine if a locally stored cached copy of the first time varying data is available; and control a transmitter in the second interface to transmit the first time varying data when it is determined that a locally stored cached copy of the first time varying data is available.

An exemplary communications device (600) of exemplary embodiment 11 includes the feature of exemplary embodiment 9, and said processor (646) is further configured to: receive a request for said first time varying data from a requesting device via a receiver in the second interface; determine if a locally stored cached copy of the first time varying data is available; and control a transmitter in the second interface to transmit a request for the first time varying to another device when it is determined that a locally stored cached copy of the first time varying data is not available; receive the first time varying data from said another device via the receiver in the second interface; and control the transmitter in the second interface to transmit the first time varying data to the requesting device after receiving the first time varying data via the second interface from said another device.

An exemplary communications device (600) of exemplary embodiment 12 includes the features of exemplary embodiment 9, and said processor (646) is further configured to: receive a request for said first time varying data from a server accessible via the Internet; and respond to the server with the first time varying data when said data is available from memory.

The techniques of various embodiments may be implemented using software, hardware and/or a combination of software and hardware. Various embodiments are directed to apparatus, e.g., a communications device such as a wireless device, e.g., a UE, a base station, a LTE Direct ENS, a Data Access Server (DAS), etc. Various embodiments, are well suited for wireless communications systems supporting D2D signaling including beacons and different technologies, e.g., in combination, e.g., LTED and at least one of WIFI, BT, and BLE. Various embodiments are directed to communications systems. Various embodiments are also directed to methods, e.g., a method of operating a communications such as a wireless device, e.g., a UE, a base station, a LTE Direct ENS, a Data Access Server (DAS), etc. etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, making a handover type decision, implementing the decision, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a wireless device, e.g., a UE, including a processor configured to implement one, multiple or all of the steps of one or more methods of the invention.

In some embodiments, the processor or processors, e.g., CPUs, of one or more devices, e.g., of the communications device such as a wireless device, e.g., a UE, a base station, a LTE Direct ENS, a Data Access Server (DAS), etc. are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device with a processor which includes a module corresponding to each of the steps of the various described methods performed by the device in which the processor is included. In some but not all embodiments an apparatus, e.g., a communications device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple communications devices including, for example, multiple wireless devices, e.g., multiple UEs including multiple interfaces and the capability to send and received two or more different types of beacons, multiple base station, a LTE Direct ENS, a Data Access Server (DAS), etc. Some devices may be network nodes. Some of the devices may be stationary wireless communications devices; other devices may be mobile wireless devices. In various embodiments the communications devices and/or network nodes or entities are implemented as hardware, e.g., separate devices each including a communications interface for sending and/or receiving signals communicating data or other information, one or more processors and memory. In some embodiments the memory includes data and/or control routines. In at least some embodiments the one or more processors operate under control instructions in the control routine or routines stored in the node's memory. Thus, when executed by the processor, the instructions in the node or other network entity to perform the functions in accordance with one or more of the methods described herein. In some embodiments the processor or processors of individual nodes are special purposed processors, e.g., ASICs, with hardware circuitry which is configured to implement or control the node or network entity in which the special purpose processor is located to implement one or more steps in accordance with a method or methods described herein. In at least some embodiments, circuits and/or other hardware are used to implement the node or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communications device to communicate information, the method comprising:
    monitoring to detect receipt of a first identifier via a first network interface corresponding to a first network, said first identifier corresponding to first information that is available via the first network, said first information indicating a source of first time varying data and a description of the first time varying data; and
    monitoring to detect receipt, via a second network interface, of a second identifier corresponding to the first time varying data available via the second network;
    determining if the first identifier received on the first interface;
    determining if the second identifier corresponding to the first identifier received on the second interface;
    making a decision whether or not to retransmit the second identifier based on said determination as to whether the first and second identifiers were received on the corresponding first and second interfaces; and
    retransmitting the second identifier in response to making a decision to retransmit the second identifier.

2. The method of claim 1, wherein the first identifier is any one of a plurality of identifiers corresponding to the second identifier.

3. The method of claim 1, wherein making a decision whether or not to retransmit the second identifier includes deciding not to retransmit the second identifier when the first and second identifiers were not received on the corresponding first and second interfaces.

4. The method of claim 1 further comprising:
    receiving with said second identifier i) first distance information indicating distance from a provider of said first time varying data, said first distance information is one of a number of hops to the source of said first time varying data or a number of hops to a device including a valid copy of said first time varying data; ii) maximum propagation information indicating a number of hops said second identifier is to be propagated from the source of said first time varying data and iii) information indicating at least two methods for accessing said first time varying data, a first method being an Internet access method and a second method being a device to device method.

5. The method of claim 1, further comprising:
determining a hop distance to a source of said first time varying data;
determining a maximum number of hops from the source the second identifier is to be transmitted; and
wherein making a decision whether or not to retransmit the second identifier further includes:
incrementing the number of hops from the source;
making a decision not to retransmit the second identifier when the incremented number of hops from the source exceeds the maximum number of hops from the source the second identifier is to be transmitted; and
making a decision to retransmit the second identifier when i) the incremented number of hops from the source is equal to or less than the maximum number of hops from the source the second identifier is to be transmitted, ii) the first identifier was received on the first network interface, and iii) the second identifier corresponding to the first identifier has been received on the second network interface.

6. The method of claim 5, further comprising:
making a decision whether or not to retransmit the first identifier on the first interface based on whether or not the second identifier corresponding to the first identifier was received on the second interface.

7. The method of claim 6, wherein making a decision whether or not to retransmit the first identifier on the first interface based on whether or not the second identifier corresponding to the first identifier was received on the second interface includes:
deciding to retransmit the first identifier on the first interface when the second identifier corresponding to the first identifier has been received on the second interface and the decision of whether or not to retransmit the second identifier was a decision to retransmit the second identifier.

8. The method of claim 1, further comprising:
making a decision to retrieve said first time varying data via a device to device connection to a device storing said first time varying data or via an Internet connection to a server storing said first time varying data based on whether or not the second identifier was received on the second interface.

9. The method of claim 8, wherein said step of making a decision to retrieve said first time varying data via a device to device connection to a device storing said first time varying data or via an Internet connection includes:
deciding to access said first time varying data via a device to device connection when said second identifier was received via the second interface and deciding to access said first time varying data via the Internet connection when the second identifier was not received on the second interface.

10. The method of claim 9, further comprising:
determining a shortest hop distance to the first time varying data; and
using a device to device communications path corresponding to the determined shortest hop distance when it is decided that the first time varying data is to be accessed via the device to device connection.

11. The method of claim 10, further comprising:
receiving a request for said first time varying data from a requesting device via the second interface;
determining if a locally stored cached copy of the first time varying data is available; and
transmitting via the second interface the first time varying data when it is determined that a locally stored cached copy of the first time varying data is available.

12. The method of claim 10, further comprising:
receiving a request for said first time varying data from a requesting device via the second interface;
determining if a locally stored cached copy of the first time varying data available;
transmitting via the second interface a request for the first time varying to another device when it is determined that a locally stored cached copy of the first time varying data is not available;
receiving the first time varying data from said another device via the second interface; and
transmitting via the second interface the first time varying data to the requesting device after receiving the first time varying data via the second interface from said another device.

13. The method of claim 10, further comprising:
receiving a request for said first time varying data from a server accessible via the Internet; and
responding to the server with the first time varying data when said first time varying data is available from memory.

14. A communications device comprising:
a first network interface corresponding to a first network;
a second network interface corresponding to a second network; and
a processor configured to:
monitor to detect receipt of a first identifier via the first network interface corresponding to the first network, said first identifier corresponding to first information that is available via the first network, said first information indicating a source of first time varying data and a description of the first time varying data;
monitor to detect receipt, via the second network interface, of a second identifier corresponding to the first time varying data available via the second network;
determine was the first identifier received on the first interface;
determine was the second identifier corresponding to the first identifier was received on the second interface;
make a decision whether or not to retransmit the second identifier based on said determination as to whether the first and second identifiers were received on the corresponding first and second interfaces; and
control the communications device to retransmit the second identifier in response to making a decision to retransmit the second identifier.

15. The communications device of claim 14, wherein said processor is configured to decide not to retransmit the second identifier when the first and second identifiers were not received on the corresponding first and second interfaces, as part of being configured to make a decision whether or not to retransmit the second identifier.

16. The communications device of claim 14, wherein said processor is further configured to:
receive with said second identifier; i) first distance information indicating distance from a provider of said first time varying data, said first distance information is one of a number of hops to the source of said time varying data or a number of hops to a device including a valid copy of said first time varying data; ii) maximum propagation information indicating a number of hops said second identifier is to be propagated from the source of said first time varying data; and iii) information indicating at least two methods for accessing said first time varying data, a first method being an Internet access method and a second method being a device to device method.

17. The communications device of claim 14, wherein said processor is further configured to:
 determine a hop distance to a source of said first time varying data;
 determine a maximum number of hops from the source the second identifier is to be transmitted;
 increment the number of hops from the source;
 make a decision not to retransmit the second identifier when the incremented number of hops from the source exceeds the maximum number of hops from the source the second identifier is to be transmitted; and
 make a decision to retransmit the second identifier when i) the incremented number of hops from the source is equal to or less than the maximum number of hops from the source the second identifier is to be transmitted, ii) the first identifier was received on the first network interface, and iii) the second identifier corresponding to the first identifier has been received on the second network interface.

18. The communications device of claim 17, wherein said processor is further configured to:
 make a decision whether or not to retransmit the first identifier on the first interface based on whether or not the second identifier corresponding to the first identifier was received on the second interface.

19. The communications device of claim 18, wherein said processor is further configured to:
 decide to retransmit the first identifier on the first interface when the second identifier corresponding to the first identifier has been received on the second interface and the decision of whether or not to retransmit the second identifier was a decision to retransmit the second identifier, as part of being configured to make a decision whether or not to retransmit the first identifier on the first interface based on whether or not the second identifier corresponding to the first identifier was received on the second interface.

20. The communications device of claim 14, wherein said processor is further configured to:
 determine whether or not the second identifier was received on the second interface; and
 make a decision to retrieve said first time varying data via a device to device connection to a device storing said first time varying data or via an Internet connection to a server storing said first time varying data based on whether or not the second identifier was received on the second interface.

* * * * *